United States Patent
Miyachi et al.

(10) Patent No.: US 10,203,558 B2
(45) Date of Patent: *Feb. 12, 2019

(54) LIQUID CRYSTAL DISPLAY DEVICE

(71) Applicant: Sharp Kabushiki Kaisha, Sakai, Osaka (JP)

(72) Inventors: Koichi Miyachi, Sakai (JP); Masanobu Mizusaki, Sakai (JP); Tsuyoshi Okazaki, Sakai (JP); Hiroshi Tsuchiya, Sakai (JP); Isamu Miyake, Sakai (JP); Toshihiro Matsumoto, Sakai (JP)

(73) Assignee: SHARP KABUSHIKI KAISHA, Sakai City, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/507,084

(22) PCT Filed: Aug. 24, 2015

(86) PCT No.: PCT/JP2015/073648
§ 371 (c)(1),
(2) Date: Feb. 27, 2017

(87) PCT Pub. No.: WO2016/031745
PCT Pub. Date: Mar. 3, 2016

(65) Prior Publication Data
US 2017/0363891 A1    Dec. 21, 2017

(30) Foreign Application Priority Data

Aug. 29, 2014  (JP) .................. 2014-176377

(51) Int. Cl.
| | | |
|---|---|---|
| G02F 1/1333 | (2006.01) | |
| G02F 1/1339 | (2006.01) | |
| C08F 22/06 | (2006.01) | |
| C09K 19/12 | (2006.01) | |
| C09K 19/30 | (2006.01) | |
| C09K 19/54 | (2006.01) | |
| G02F 1/13 | (2006.01) | |
| C09K 15/08 | (2006.01) | |
| C09K 15/30 | (2006.01) | |
| C09K 19/56 | (2006.01) | |
| G02F 1/1337 | (2006.01) | |
| G02F 1/1341 | (2006.01) | |
| C08G 73/10 | (2006.01) | |

(52) U.S. Cl.
CPC ............ *G02F 1/1339* (2013.01); *C08F 22/06* (2013.01); *C08G 73/1075* (2013.01); *C09K 15/08* (2013.01); *C09K 15/30* (2013.01); *C09K 19/12* (2013.01); *C09K 19/30* (2013.01); *C09K 19/3003* (2013.01); *C09K 19/3098* (2013.01); *C09K 19/54* (2013.01); *C09K 19/56* (2013.01); *G02F 1/13* (2013.01); *G02F 1/1341* (2013.01); *G02F 1/133711* (2013.01); *G02F 1/133788* (2013.01); *C09K 2019/122* (2013.01); *C09K 2019/301* (2013.01); *C09K 2019/3004* (2013.01); *C09K 2019/3016* (2013.01); *G02F 2001/13415* (2013.01); *G02F 2001/133397* (2013.01)

(58) Field of Classification Search
CPC ........ G02F 1/1333; G02F 1/1339; G02F 1/13; G02F 1/133711; G02F 1/133788; G02F 1/1341; G02F 2001/13415; C08F 22/06; C09K 19/12; C09K 19/54; C09K 19/3003; C09K 19/3098; C09K 19/56; C09K 15/08; C09K 15/30; C09K 2019/122; C09K 2019/3004; C09K 2019/301; C09K 2019/3016; C08G 73/1075

See application file for complete search history.

(56) References Cited

U.S. PATENT DOCUMENTS

| | | |
|---|---|---|
| 2011/0051049 A1 | 3/2011 | Goetz et al. |
| 2014/0104544 A1 | 4/2014 | Goetz et al. |
| 2014/0204329 A1 | 7/2014 | Bae et al. |
| 2015/0002797 A1 | 1/2015 | Roh et al. |
| 2017/0276976 A1* | 9/2017 | Miyachi ............... G02F 1/133 |

FOREIGN PATENT DOCUMENTS

| | | |
|---|---|---|
| JP | 2007-197731 A | 8/2007 |
| JP | 2011-515543 A | 5/2011 |
| JP | 2014-142585 A | 8/2014 |
| KR | 10-2013-0121223 A | 11/2013 |

* cited by examiner

*Primary Examiner* — Geraldina Visconti
(74) *Attorney, Agent, or Firm* — ScienBiziP, P.C.

(57) ABSTRACT

The present invention provides a liquid crystal display device that maintains a sufficient voltage holding ratio over a long period of time even when a liquid crystal panel having a narrower frame is used and that undergoes no burn-in or no stains on a display screen. The liquid crystal display device of the present invention includes an active-matrix liquid crystal panel and a backlight, wherein the liquid crystal panel includes a liquid crystal layer, a pair of substrates between which the liquid crystal layer is sandwiched, alignment layers disposed on surfaces of the pair of substrates facing the liquid crystal layer, and a seal part that bonds the pair of substrates to each other and that is disposed around the liquid crystal layer, and the liquid crystal panel is formed by a liquid crystal one-drop fill process, wherein the liquid crystal layer includes a liquid crystal material and at least one of a radical scavenger and an antioxidant, and the seal part has a width of 0.6 mm or less at least in part.

10 Claims, 4 Drawing Sheets

(R: ALKYL OR OTHER GROUPS, IN PART OF LIQUID CRYSTALS, ALIGNMENT LAYERS, AND SEAL)

LIQUID CRYSTAL DISPLAY DEVICE

TECHNICAL FIELD

The present invention relates to liquid crystal display devices. More particularly, the invention relates to an active-matrix-driven liquid crystal display device.

BACKGROUND ART

Liquid crystal display devices, which are display devices that use liquid crystal compositions for display, typically adopt display systems in which a liquid crystal panel including a pair of substrates between which a liquid crystal composition is filled is irradiated with light from a backlight, and a voltage is applied to the liquid crystal composition to change the alignment of liquid crystal molecules, thereby controlling the amount of light that can be transmitted through the liquid crystal panel. Such liquid crystal display devices are characterized by being thin and light and consuming little electricity, and thus have been used in electronic devices such as smartphones, tablet PCs, and car navigation systems.

Particularly in applications such as smartphones and tablet PCs, where the sizes of bodies are limited, it has been necessary to narrow off-screen areas to achieve larger screens. Thus, liquid crystal display devices are required to include liquid crystal panels having peripheries (hereinafter also referred to as "frames") with reduced widths.

In applications such as smartphones, pixels have recently been achieving a high resolution. This tends to increase the number and area of wires and black matrices in liquid crystal panels to decrease the ratio of the area of apertures that can be used for display (aperture ratio). Decreases in aperture ratio are directly linked to decreases in the amount of light that can be transmitted through liquid crystal panels. Thus, to maintain the display performance, such as contrast ratio, of liquid crystal display devices, studies have been conducted to significantly improve the luminance of backlights.

Liquid crystal compositions for use in liquid crystal display devices have been required to have improved stability so as to withstand loads during the process for manufacturing the liquid crystal display devices and such that the liquid crystal display devices manufactured can exhibit stable properties over a long period of time. For example, Patent Literature 1 discloses the addition of an antioxidant and a light stabilizer to a liquid crystal composition. Patent Literature 2 discloses the addition of a stabilizer to a liquid crystal composition (see Table C at paragraphs [0208] to [0211]).

CITATION LIST

Patent Literature

PTL 1: Japanese Unexamined Patent Application Publication No. 2007-197731
PTL 2: Japanese Unexamined Patent Application Publication (Translation of PCT Application) No. 2011-515543

SUMMARY OF INVENTION

Technical Problem

As described above, developments for applications such as smartphones and tablet PCs have recently been made so as to achieve liquid crystal panels having narrower frames and backlights having higher luminances, but these developments have resulted in an increased likelihood of stains (unevenness) at the edges of liquid crystal panel screens and the edges of box pattern displays. The defects at the edges of box pattern displays will be detected as burn-in.

The inventors have investigated the correlation between the above-described defects, such as burn-in and stains, and the reduction in seal part width for achieving liquid crystal panels having narrower frames. At the periphery of a liquid crystal panel, a seal part to be filled with a liquid crystal material is formed by stacking a TFT substrate and a color filter substrate on top of each other. The reduction in seal part width allows moisture, oxygen, and other impurities to readily permeate a liquid crystal layer from the outside of the liquid crystal panel. The inventors conducted tests to find that no defects occur when the liquid crystal panel is placed in a nitrogen atmosphere and that noticeable defects occur in an oxygen atmosphere, determining that the permeation of oxygen into the liquid crystal panel is a cause of the defects. That is to say, it is necessary to take measures to prevent oxidation in liquid crystal panels.

When a liquid crystal panel is manufactured by a liquid crystal one-drop fill process, a photocurable sealing material is applied to either of the substrates by drawing with a dispenser, and a liquid crystal material is dropped onto either of the substrates, after which the substrates are stacked on top of each other and then irradiated with UV light or visible light to cure the sealing material. The light to be applied is selected according to the main reactive wavelength of a photopolymerization initiator in the sealing material. However, at the periphery, it is necessary to provide space for disposing light-shielding members such as wires, and when the width of the seal part is narrow, sufficient space not overlapping the light-shielding members cannot be provided. In the light-shielding region overlapping the light-shielding members, the sealing material is not irradiated with sufficient light, thus leading to insufficient curing of the sealing material, and as a result, components, mainly, low-molecular components in the sealing material are likely to flow out into the liquid crystal material in the liquid crystal layer. The sealing material typically contains a photopolymerization initiator in addition to a major proportion of epoxy materials and acrylic materials, and if the highly reactive photopolymerization initiator flows out into the liquid crystal material, and light from a backlight having enhanced luminance is applied, defects are highly likely to occur. However, to achieve a liquid crystal panel having a narrower frame, it is necessary to reduce the seal part width while maintaining an overlapping area of the light-shielding region and the seal part, and thus it has been difficult to reduce the amount of outflow into the liquid crystal layer.

These various investigations have suggested that photopolymerization initiators cause burn-in and stains according to the following flow.

(1) Radical Generation

Upon irradiation of a liquid crystal panel with light (amount of energy: hv) from a backlight, an unreacted photopolymerization initiator, which has not reacted during a photocuring treatment of a sealing material, is excited to generate radicals, as expressed by the following formula (A-I). In particular, radicals are generated significantly when a backlight having enhanced luminance is used.

[Chem. 1]

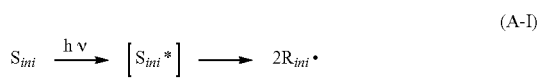

$S_{ini}$: Unreacted photopolymerization initiator
$R_{ini}$: Radical generated from unreacted photopolymerization initiator (2-1) First Ion Formation The radicals generated from the unreacted photopolymerization initiator in the sealing material flow out into a liquid crystal layer, and the radicals that have flowed out are ionized. Alternatively, the unreacted photopolymerization initiator in the sealing material flows out into the liquid crystal layer, and the photopolymerization initiator that has flowed out, upon irradiation with light from the backlight, becomes radicals and is further ionized.

(2-2) Second Ion Formation

The radicals generated from the unreacted photopolymerization initiator in the sealing material flow out into the liquid crystal layer, and the radicals move from the photopolymerization initiator to liquid crystal molecules to ionize the liquid crystal molecules. Alternatively, the unreacted photopolymerization initiator in the sealing material flows out into the liquid crystal layer, and the photopolymerization initiator that has flowed out, upon irradiation with light from the backlight, becomes radicals, and the radicals further move from the photopolymerization initiator to the liquid crystal molecules to ionize the liquid crystal molecules.

(3) Formation of Oxide

If the width of a seal part is small, moisture and oxygen readily permeate the liquid crystal layer through the seal part. The moisture and oxygen that have permeated cause liquid crystals, an alignment layer, radicals derived from the unreacted photopolymerization initiator that has flowed out, and others to be oxidized, and the oxides thus formed cause ionization.

(4) Decrease in Voltage Holding Ratio

Ions in the liquid crystal layer accumulate at the edge of the screen of the liquid crystal panel and the edge of a box pattern display to decrease the voltage holding ratios (VHRs) in these areas, thereby causing the burn-in and stains described above.

As described above, additives such as antioxidants and light stabilizers were added to some conventional liquid crystal compositions, but these additives were not for solving the problem specific to the use of a liquid crystal panel having a narrower frame. Specifically, when a liquid crystal material was oxidized by a slight amount of dissolved oxygen remaining after the preparation of the liquid crystal material itself and by oxygen from the outside that had permeated a liquid crystal panel during the manufacture of the liquid crystal panel, the oxide sometimes caused burn-in and stains on a display. To prevent this, conventionally, antioxidants and other additives that function to eliminate oxygen from oxides formed as a result of the effect of light and heat in the presence of oxygen were added to liquid crystal compositions. However, the reduction in seal part width significantly increased the amount of oxygen permeation during the use of liquid crystal panel products and permitted the permeation of sealing material-derived impurities such as highly reactive photopolymerization initiators. As a result, the antioxidants were consumed in larger amounts than before to promote the oxidation of liquid crystal molecules and alignment layers. Some of the oxides thus formed were ionized to cause a decrease in voltage holding ratio.

The present invention has been made in view of the above circumstances, and it is an object of the present invention to provide a liquid crystal display device that maintains a sufficient voltage holding ratio over a long period of time even when a liquid crystal panel having a narrower frame is used and that undergoes no burn-in or no stains on a display screen.

Solution to Problem

The inventors focused on the fact that a liquid crystal display device having a reduced seal part width of 0.6 mm or less experiences a decrease in voltage holding ratio at the edge of a liquid crystal panel screen and the edge of a box pattern display, which can particularly cause defects such as burn-in and stains on the display screen. Thus, the inventors performed intensive studies and found that the defects are mainly due to radicals being generated from the seal part by exposure to light from a backlight and flowing out into a liquid crystal layer. As a result, the inventors found that adding at least one of a radical scavenger and an antioxidant to a liquid crystal layer can completely solve the above problem, thereby completing the present invention.

Thus, one aspect of the present invention may be a liquid crystal display device including an active-matrix liquid crystal panel and a backlight, wherein the liquid crystal panel includes a liquid crystal layer, a pair of substrates between which the liquid crystal layer is sandwiched, alignment layers disposed on surfaces of the pair of substrates facing the liquid crystal layer, and a seal part that bonds the pair of substrates to each other and that is disposed around the liquid crystal layer, and the liquid crystal panel is formed by a liquid crystal one-drop fill process, wherein the liquid crystal layer includes a liquid crystal material and at least one of a radical scavenger and an antioxidant, and the seal part has a width of 0.6 mm or less at least in part.

Advantageous Effects of Invention

According to the liquid crystal display device of the present invention, which has the above-described configuration, at least one of the radical scavenger and the antioxidant can inactivate radicals that have flowed out into the liquid crystal layer to prevent the decrease in voltage holding ratio. As a result, if the seal part has a reduced width, a sufficient voltage holding ratio can be maintained over a long period of time to prevent the occurrence of burn-in and stains on a display screen.

DESCRIPTION OF EMBODIMENTS

An embodiment of the present invention will be described below. It should be noted that the description of the following embodiment is not intended to limit the present invention, and any design changes can be made as appropriate within the scope of the present invention.

Figure 1:
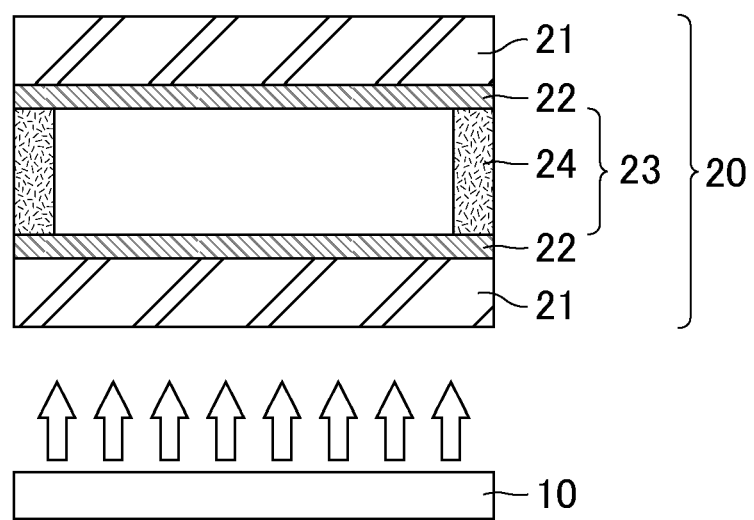
FIG. 1 is a schematic cross-sectional view of a liquid crystal display device according to this embodiment.

FIG. 1 is a schematic cross-sectional view of a liquid crystal display device according to this embodiment. FIG. 2(a) is a schematic plan view of the liquid crystal display device according to this embodiment. FIG. 2(b) is an enlarged plan view of a gate terminal unit. FIG. 2(c) is an enlarged plan view of a source terminal unit. The liquid crystal display device according to this embodiment includes an active-matrix liquid crystal panel 20 and a backlight 10, wherein the liquid crystal panel 20 includes a liquid crystal layer 23, a pair of substrates 21 between which the liquid crystal layer 23 is sandwiched, alignment layers 22 disposed on surfaces of the pair of substrates 21 facing the liquid crystal layer 23, and a seal part 24 that bonds the pair of substrates 21 to each other and is disposed around the liquid crystal layer 23, and the liquid crystal panel 20 is formed by a liquid crystal one-drop fill process, wherein the liquid crystal layer 23 contains a liquid crystal material and at least one of a radical scavenger and an antioxidant, and the seal part 24 has a width of 0.6 mm or less at least in part.

The active-matrix liquid crystal panel 20 for use may be any standard liquid crystal panel that employs an active-matrix display system as long as the panel includes the liquid crystal layer 23, the pair of substrates 21 between which the liquid crystal layer 23 is sandwiched, the alignment layers 22 disposed on surfaces of the pair of substrates 21 facing the liquid crystal layer 23, and the seal part 24 that bonds the pair of substrates 21 to each other and is disposed around the liquid crystal layer 23. In general, in the active-matrix display system, when active elements, such as thin-film transistors (TFTs), provided in pixels are ON, a signal voltage is applied through the TFTs to electrodes, and electric charges accumulated in the pixels during this time are held during an OFF period of the active elements. The ratio of the accumulated electric charge held during one frame period (e.g., 16.7 ms) is a voltage holding ratio (VHR). That is to say, a low VHR means that the voltage that is to be applied to the liquid crystal layer tends to attenuate with time, and a high VHR is required in the active-matrix display system.

One example of the pair of substrates 21 is a combination of an active-matrix substrate (TFT substrate) and a color filter (CF) substrate. The active-matrix substrate for use may be one which is commonly used in the field of liquid crystal display devices. The active-matrix substrate may be configured such that, in plan view, a plurality of parallel gate signal lines 28g; a plurality of source signal lines 28s extending orthogonally to the gate signal lines 28g and formed to be parallel to each other; active elements, such as TFTs, arranged corresponding to intersections of the gate signal lines 28g and the source signal lines 28s; pixel electrodes arranged in a matrix in regions defined by the gate signal lines 28g and the source signal lines 28s; and other components are provided on a transparent substrate. In a horizontal alignment mode are further provided a common line, a counter electrode connected to the common line, and other components. TFTs suitable for use are those in which channels are formed of amorphous silicon, polysilicon, or IGZO (indium-gallium-zinc-oxygen), which is an oxide semiconductor. In particular, oxide semiconductors have small off leakages and thus favor low-frequency driving of liquid crystal display devices, but low-frequency driving cannot be carried out when the liquid crystal layer 23 has a low VHR. The present invention can provide the liquid crystal layer 23 with a high VHR and thus enables low-frequency driving. Thus, a combination of an oxide semiconductor and the present invention is particularly suitable.

The color filter substrate for use may be one which is commonly used in the field of liquid crystal display devices. The color filter substrate may be configured such that a black matrix formed in a grid-like fashion, color filters formed inside the grid, i.e., pixels, and other components are provided on a transparent substrate.

Regarding the pair of substrates 21, both the color filter and the active matrix may be formed on either of the substrates.

Between the pair of substrates 21 and the liquid crystal layer 23, the alignment layers 22 lie. The alignment layers 22 are functioned to control the alignment of liquid crystal molecules in the liquid crystal layer 23, and when a voltage applied to the liquid crystal layer 23 is lower than a threshold voltage (including when no voltage is applied), the alignment of liquid crystal molecules in the liquid crystal layer 23 is controlled mainly by the function of the alignment layers 22. In this state, the angle between the surface of either of the pair of substrates 21 and the major axes of liquid crystal molecules is called a "pretilt angle". As used herein. "pretilt angle" refers to an angle of the inclination of liquid crystal molecules from a direction parallel to the substrate surface: the angle parallel to the substrate surface is 0°, and the angle of the normal line of the substrate surface is 90°.

The size of the pretilt angle of liquid crystal molecules provided by the alignment layers 22 is not limited to a particular value. The alignment layers 22 may be horizontal alignment layers or vertical alignment layers and are preferably horizontal alignment layers. In the case of horizontal alignment layers, the pretilt angle is preferably substantially 0° (e.g., less than 10°), more preferably 0° in order to maintain high contrast properties over a long time period. When the display mode is an IPS mode or an FFS mode, the pretilt angle is preferably 0° in view of viewing angle characteristics. When the display mode is a TN mode, the pretilt angle is set, for example, to approximately 2° due to the restriction by the mode.

The alignment layers 22 may be photo-alignment layers formed of a photo-alignable material. The term "photo-alignable material" generally means a material that undergoes a structural change as a result of the irradiation with light (electromagnetic waves), such as ultraviolet light or visible light, to exhibit the property of regulating the alignment of liquid crystal molecules near the material (alignment regulation ability) or to undergo a change of the magnitude and/or the direction of the alignment regulation ability.

Examples of the photo-alignable material include materials having a photoreactive moiety where reactions such as dimerization (dimer formation), isomerization, photo-Fries rearrangement, and decomposition occur upon photoirradiation. Examples of suitable photoreactive moieties (functional groups) that will be dimerized and isomerized by photoirradiation include cinnamate represented by the following formula (B-1), 4-chalcone represented by the following formula (B-2-1), 4'-chalcone represented by the following formula (B-2-2), coumarin represented by the following formula (B-3), and stilbene represented by the following formula (B-4). The following formula (B-1-I) represents the isomerization reaction and the dimerization reaction of cinnamate.

[Chem. 2]

(B-1)

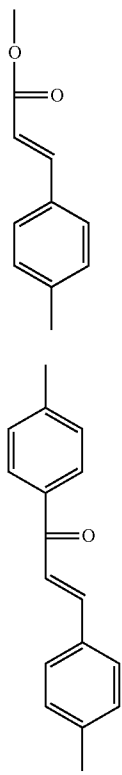

(B-2-1)

(B-2-2)

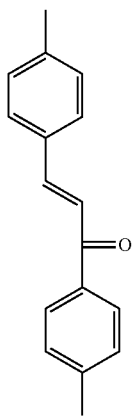

(B-3)

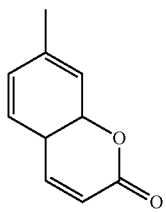

(B-4)

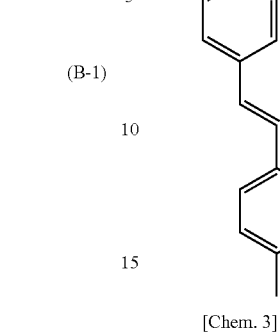

[Chem. 3]

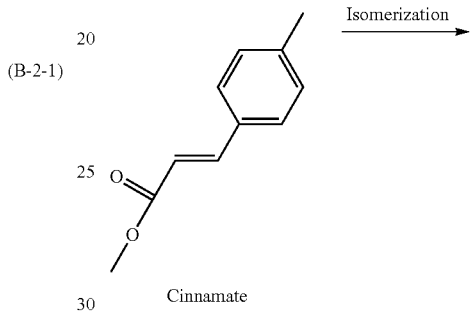

Cinnamate

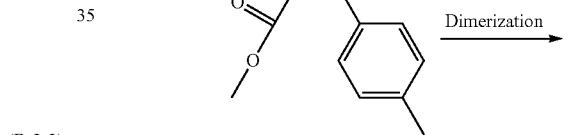

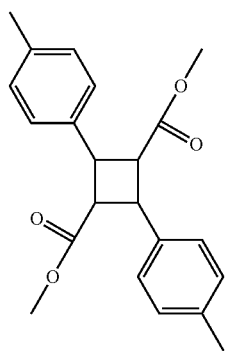

(B-1-1)

One example of suitable photoreactive moieties (functional groups) that will be isomerized by photoirradiation is azobenzene. The following formula (B-5-1) represents the trans isomer of azobenzene, and the following formula (B-5-2) represents the cis isomer of azobenzene.

[Chem. 4]

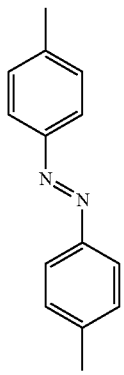
(B-5-1)

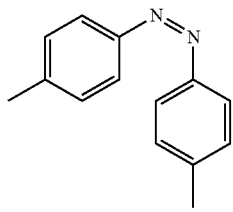
(B-5-2)

One example of suitable photoreactive moieties that will undergo photo-Fries rearrangement as a result of photoirradiation is a phenol ester structure represented by the following formula (B-6). The phenol ester structure undergoes photo-Fries rearrangement as represented by the following formula (B-6-I).

[Chem. 5]

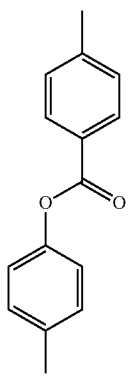
(B-6)

[Chem. 6]

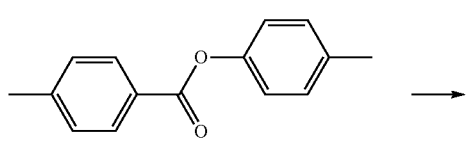

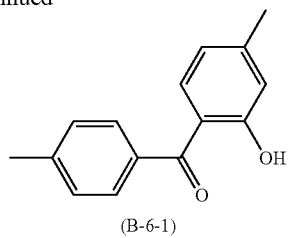
(B-6-1)

Examples of suitable photoreactive moieties that will be decomposed by photoirradiation include cyclobutane structures. One example of photo-alignment layers including a cyclobutane structure is a polymer obtained by copolymerizing a monomer of an acid anhydride having a cyclobutane structure represented by the following formula (B-7-1) and a monomer of an amine compound represented by the following formula (B-7-2). As expressed by the following formula (B-7-I), this polymer, upon photoirradiation, undergoes ring opening of the cyclobutane structure to be photoalignable. Hydrogen atoms in the cyclobutane structure represented by the following formula (B-7-1) may be substituted with other atoms or functional groups.

[Chem. 7]

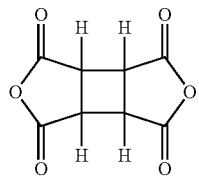
(B-7-1)

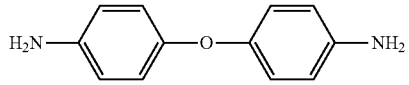
(B-7-2)

[Chem. 8]

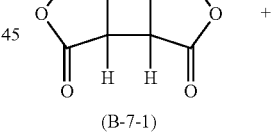
(B-7-1)

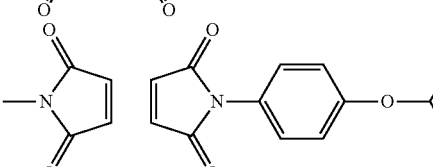
(B-7-2)

(B-7-1)

In this embodiment, polymer sustained alignment (PSA) technology may be used. The PSA technology involves filling a liquid crystal composition containing a photopolymerizable monomer in between the pair of substrates 21 and then irradiating the liquid crystal layer 23 with light to polymerize the photopolymerizable monomer, thereby forming a polymer on the surfaces of the alignment layers 22, which polymer fixes an initial tilt (pretilt) of liquid crystals.

The PSA technology provides, for example, a configuration including, on surfaces of the alignment layers 22 facing the liquid crystal layer 23, a layer containing a polymer obtained by polymerizing a photopolymerizable monomer represented by the following formula (C).

A1-Y-A2           (C)

(In the formula, Y represents a structure including at least one benzene ring and/or fused benzene ring. Hydrogen in the benzene ring and the fused benzene ring may be substituted with halogen. At least one of A1 and A2 represents acrylate or methacrylate. A1 and A2 are directly bonded to the benzene ring or the fused benzene ring.)

The backbone Y in the above formula (C) is preferably a structure represented by the following formula (C-1), (C-2), or (C-3). Hydrogen atoms in the following formulas (C-1), (C-2), and (C-3) may each independently be substituted with a halogen atom.

[Chem. 9]

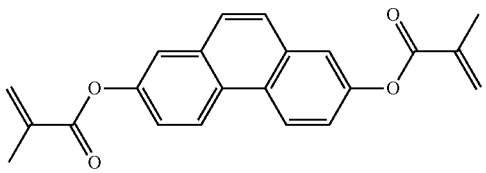

Specific examples of the photopolymerizable monomer represented by the above formula (C) include the following formulas (C-1-1), (C-1-2), and (C-3-1).

[Chem. 10]

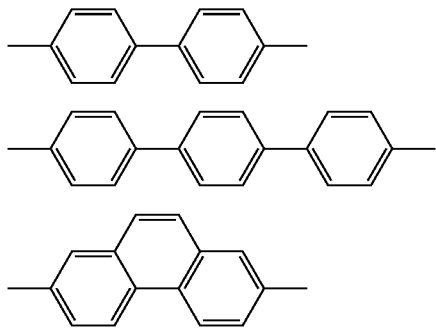

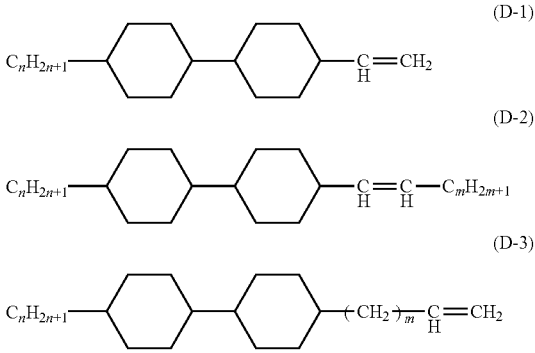

In this embodiment, the liquid crystal layer 23 contains a liquid crystal material and at least one of a radical scavenger and an antioxidant.

Liquid Crystal Material

The liquid crystal material may have a dielectric anisotropy ($\Delta\varepsilon$), as defined by the following equation (P), of a negative value or a positive value. In other words, the liquid crystal material may have a negative dielectric anisotropy or a positive dielectric anisotropy. The liquid crystal material having a negative dielectric anisotropy may have a $\Delta\varepsilon$ of $-1$ to $-20$, for example. The liquid crystal material having a positive dielectric anisotropy may have a $\Delta\varepsilon$ of 1 to 20, for example.

$\Delta\varepsilon$=(dielectric constant in major axis direction)−(dielectric constant in minor axis direction)     (P)

In conventional liquid crystal display devices, defects such as burn-in and stains tended to be more apparent when a liquid crystal material having a negative dielectric anisotropy was used than when a liquid crystal material having a positive dielectric anisotropy was used. This is probably because a liquid crystal material having a negative dielectric anisotropy is highly polarized in the minor axis direction and thus, when ionized, has a greater effect on the decrease in VHR. That is to say, the radical scavenger and/or the antioxidant for use in the present invention produce a greater effect in systems where a liquid crystal material having a negative dielectric anisotropy is used.

At least one component of the liquid crystal material is preferably a compound having an alkenyl structure. Examples of the compound having an alkenyl structure include compounds represented by the following formulas (D-1), (D-2), and (D-3).

[Chem. 11]

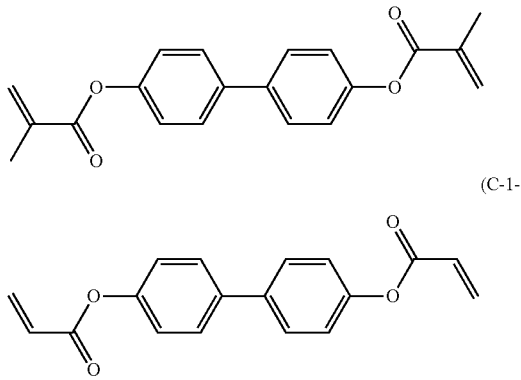

(In the formula, m and n are the same or different integers, preferably 1 to 6.)

One specific example of the compound having an alkenyl structure represented by the above formula (D-1) is the following formula (D-1-1).

[Chem. 12]

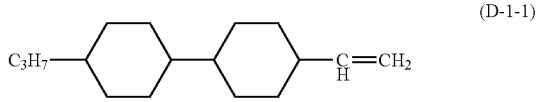
(D-1-1)

At least one component of the liquid crystal material is preferably a compound including an alkoxy structure. Examples of the compound including an alkoxy structure include compounds represented by the following formulas (E-1), (E-2), (E-3), (E-4), and (E-5).

[Chem. 13]

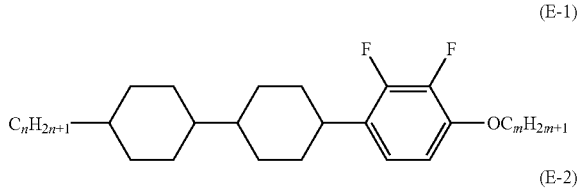
(E-1)

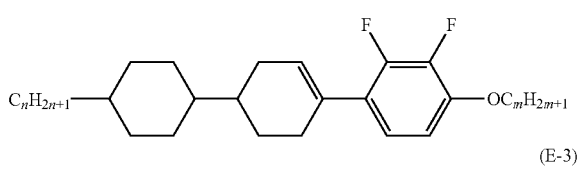
(E-2)

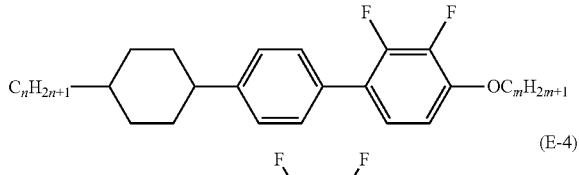
(E-3)

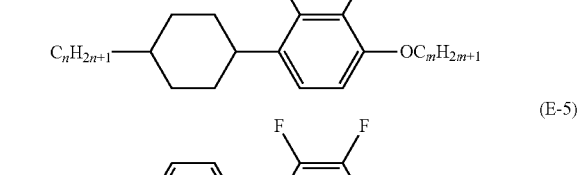
(E-4)

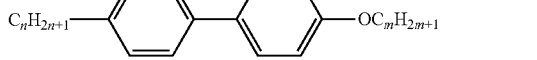
(E-5)

(In the formula, m and n are the same or different integers, preferably 1 to 7.)

One specific example of the compound including an alkoxy structure represented by the above formula (E-3) is a compound represented by the following formula (E-3-1).

[Chem. 14]

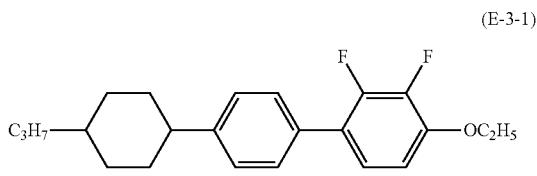
(E-3-1)

Radical Scavenger

Figure 3:
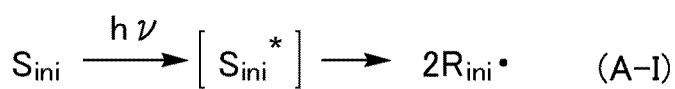
FIG. 3 is a reaction mechanism where a hindered amine compound (radical scavenger) inactivates a radical generated from a photo-alignment layer.
Figure 3:
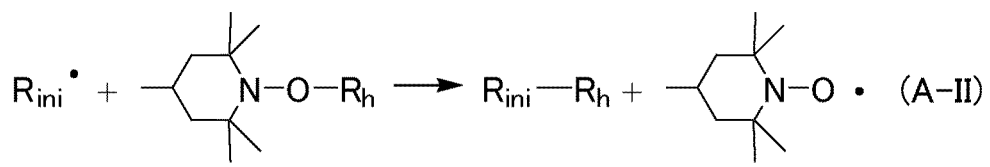
Figure 3:
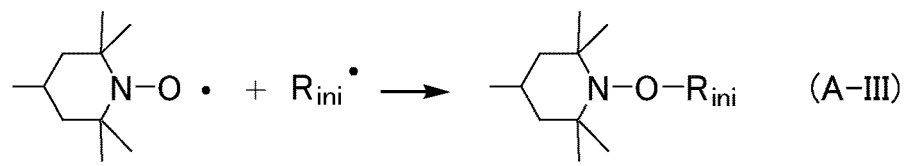
Figure 3:
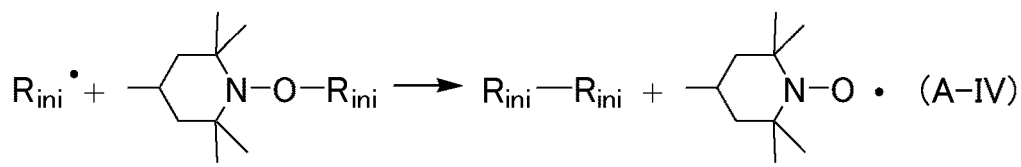

Any radical scavenger may be used that reacts with seal radicals generated from the seal part 24 and liquid crystal radicals, which are the seal radicals that have moved to liquid crystals, to inactivate the seal radicals and the liquid crystal radicals. For example, hindered amine compounds are suitable for use. FIG. 3 is a reaction mechanism where a hindered amine compound (radical scavenger) inactivates a radical generated from the seal part 24. As expressed by formula (A-I) of FIG. 3, an unreacted photopolymerization initiator $S_{ini}$ in the seal part 24 is excited by irradiation with light (amount of energy: hv) to generate seal radicals $R_{ini}$. As expressed by formula (A-II) of FIG. 3, a hindered amine compound added to a liquid crystal material constituting the liquid crystal layer 23 can selectively react with the seal radical $R_{ini}$, which has been generated from the photopolymerization initiator that has flowed out of the seal part 24, to inactivate the seal radical $R_{ini}$. The hindered amine compound itself, after reacting with the seal radical $R_{ini}$ generated from the seal part 24, becomes a hindered amine radical. $R_h$ in formula (A-II) represents a hydrocarbon group derived from the hindered amine compound. As expressed by formula (A-III) of FIG. 3, the hindered amine radical is bound to another seal radical $R_{ini}$ generated from the seal part 24, and as a result, both the hindered amine radical and the seal radical $R_{ini}$ generated from the seal part 24 will disappear. As expressed by formula (A-IV) of FIG. 3, the compound formed by the bonding of the hindered amine radical with the seal radical $R_{ini}$ generated from the seal part 24 also acts as a radical scavenger and reacts with yet another seal radical $R_{ini}$ generated from the seal part 24 to form a hindered amine radical. This hindered amine radical, as expressed by formula (A-III), is a radical scavenger that reacts with a seal radical $R_{ini}$ generated from the seal part 24. In this manner, in a system where a hindered amine compound (radical scavenger) is added, a cycle of formula (A-I)→formula (A-II)→formula (A-III)→formula (A-I)→formula (A-IV)→formula (A-III)→ . . . repeats. This cycle causes no reduction of the radical scavenger and enables continuous inactivation of radicals generated, and as a result, ion generation from the radicals can be inhibited over a long period of time. In other words, the hindered amine compound (radical scavenger), if added in a small amount, can prevent the decrease in VHR, which can be caused by exposure to light from a backlight, over a long period of time.

In addition, the hindered amine compound is highly reactive with radicals generated from the seal part 24 and thus can rapidly inactivate radicals in the liquid crystal layer 23. Therefore, when an antioxidant is used in combination, the hindered amine compound can effectively prevent the antioxidant from being consumed by reacting with radicals generated from the seal part 24, and as a result, oxide formation in the liquid crystal layer can also be prevented. Therefore, burn-in and stains derived from oxides can also be prevented.

Furthermore, the significantly reduced ion generation in the liquid crystal layer 23 due to the use of a radical scavenger such as a hindered amine compound allows a frame period in driving a liquid crystal display device to be set long. In other words, the liquid crystal display device can be driven at a low frequency, which can reduce the power consumption to a low level.

Examples of hindered amine compounds include compounds represented by the following formulas (F-1) and (F-2), and in particular, the compound represented by the following formula (F-1) is suitable for use.

[Chem. 15]

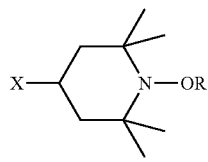
(F-1)

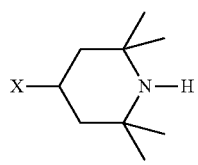
(F-2)

(In the formulas, X represents a monovalent organic group, and R represents a hydrocarbon group.)

Specific examples of the hindered amine compound represented by the above formula (F-1) include compounds represented by the following formulas (F-1-1), (F-1-2), (F-1-3), (F-1-4), and (F-1-5).

Specific examples of the hindered amine compound represented by the above formula (F-2) include compounds represented by the following formulas (F-2-1) and (F-2-2). Furthermore, a compound of the following formula (F-2-3) having a similar structure to the above formula (F-2), where hydrogen is substituted with methyl, can also be used.

[Chem. 17]

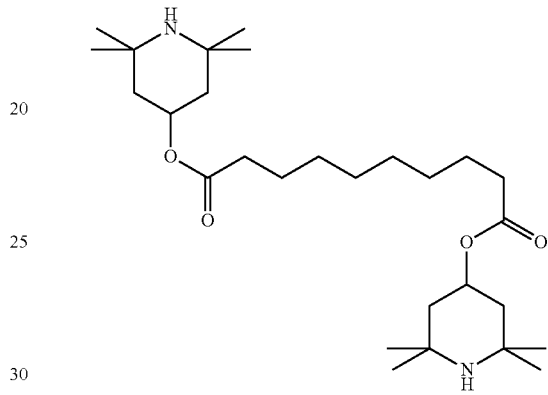
(F-2-1)

[Chem. 16]

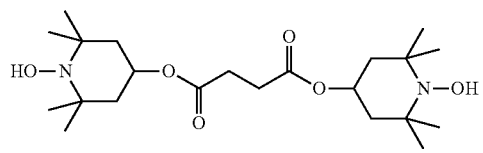
(F-1-1)

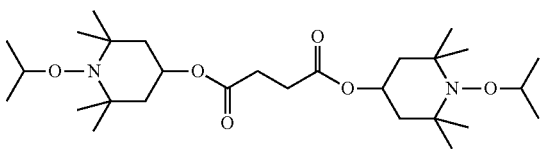
(F-1-2)

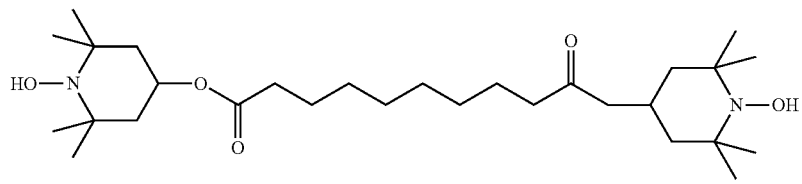
(F-1-3)

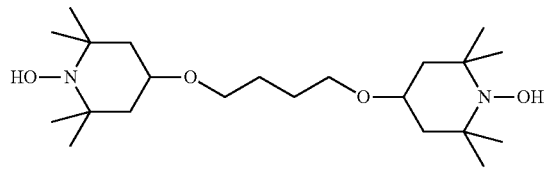
(F-1-4)

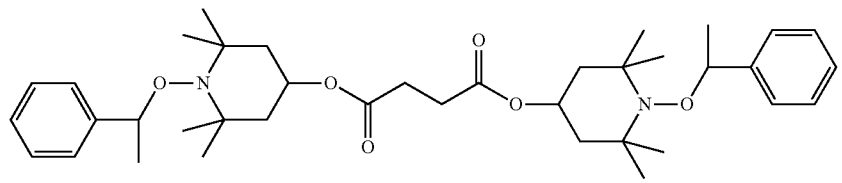
(F-1-5)

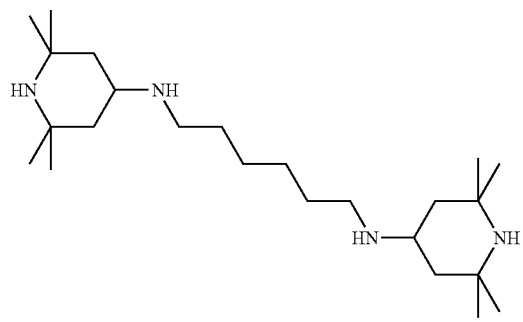 (F-2-2)
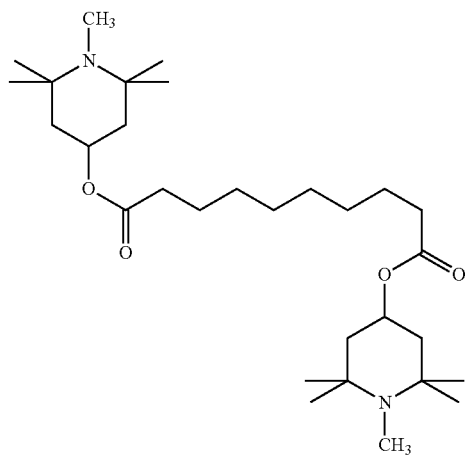 (F-2-3)
The hindered amine compound may be a structure having a radical moiety, as represented by the following formula (F-3). Specific examples thereof include structures represented by the following formulas (F-3-1), (F-3-2), and (F-3-3).
[Chem. 18]
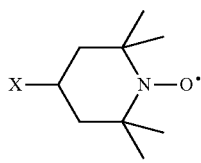 (F-3)
[Chem. 19]
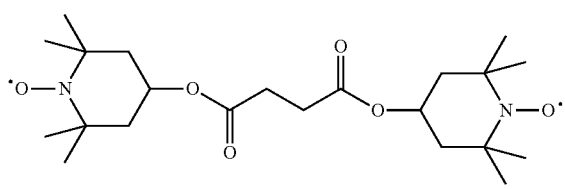 (F-3-1)
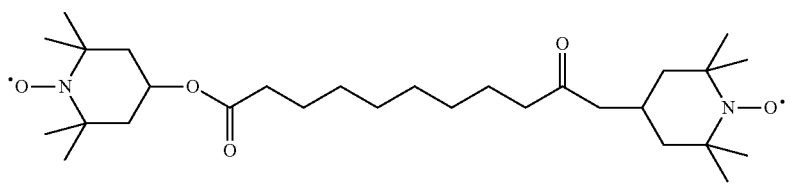 (F-3-2)
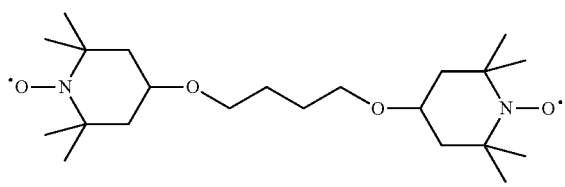 (F-3-3)

The concentration of the radical scavenger (hindered amine compound) is preferably 1 ppm to 1,000 ppm. Within this range, radicals generated from the seal part 24 can be sufficiently inactivated, and the effect of reducing the decrease in VHR is particularly sufficiently produced. An excessively high concentration of the hindered amine compound may be undesirable for VHR reduction because hindered amine radicals can be stably present. Thus, antioxidants described below may be added instead of increasing the concentration of the hindered amine compound. The concentration of the radical scavenger (hindered amine compound) is more preferably up to 500 ppm, still more preferably up to 250 ppm.

Antioxidant

Any antioxidant may be used that has higher reactivity with oxygen or oxides than a liquid crystal material has, and phenolic antioxidants are suitable for use, for example.

Figure 5:
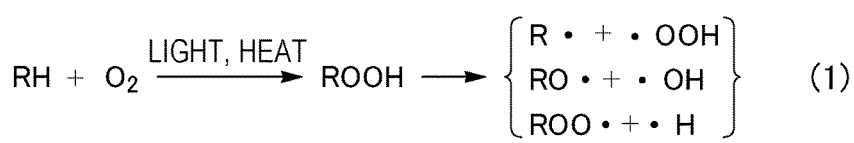
FIG. 5 illustrates an action of a phenolic antioxidant in the present invention.
Figure 5:
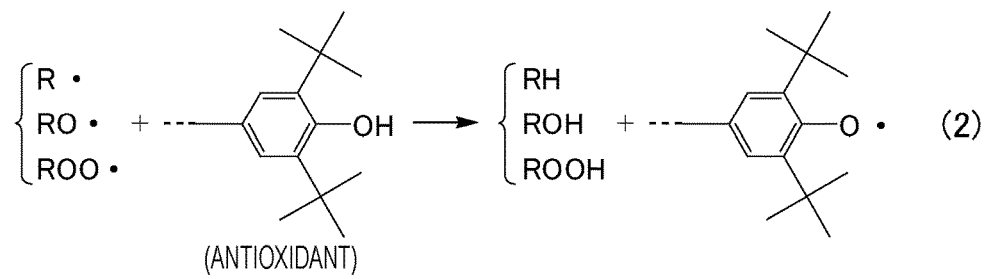
Figure 5:
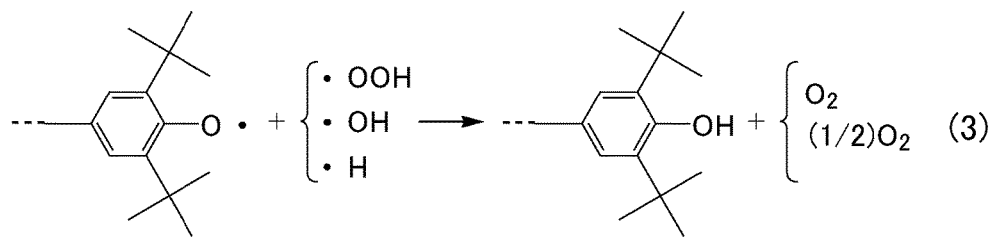

FIG. 5 illustrates an action of a phenolic antioxidant in the present invention. As expressed by formula (1) of FIG. 5, when oxygen permeates a liquid crystal panel, and light or heat energy is added, alkyl (R) or other groups in a liquid crystal material, alignment layers, and a sealing material are oxidized to form an oxidized substance (ROOH). In this embodiment, the seal part 24 has a width of 0.6 mm or less at least in part, into which structure oxygen more readily permeates than into conventional structures. The oxidized substance generates radicals, and the radicals will be ionized in an environment where no antioxidant and no radical scavenger exist. When the liquid crystal material is oxidized and ionized, ions generate in the liquid crystal layer 23. In addition, also when the alignment layers and the sealant are oxidized, oxidized substances dissociated from polymers constituting the alignment layers and the sealant are ionized to flow out into the liquid crystal layer 23, and as a result, ions will generate in the liquid crystal layer 23. As a result, the ions in the liquid crystal layer 23 cause a decrease in VHR. However, an antioxidant, when added, can react with the radicals that have yet to be ionized to prevent ion generation that might otherwise be caused by the oxidation of the liquid crystal material, the alignment layers, and the sealing material, as expressed by formulas (2) and (3) of FIG. 5. In the cycle expressed by formulas (2) and (3) of FIG. 5, the amount of antioxidant will not decrease, and thus ionization of radicals can be prevented over a long period of time.

As expressed by FIG. 5, the antioxidant has a function to effect elimination of oxygen from oxides (reduction) through the repetition of a cycle of elimination→addition→elimination of hydrogen so as to prevent oxidation degradation (decomposition and ionization) over a long period of time. By contrast, the radical scavenger has a function to trap radicals in the alignment layers and liquid crystals, regardless of whether the radicals are oxides, and repeatedly traps and releases the radicals to prevent the ionization of the radicals. By using the antioxidant and the radical scavenger in combination, the effect of reducing the decrease in VHR can be particularly sufficiently produced.

One example of phenolic antioxidants is a compound represented by the following formula (G). More specific examples include compounds represented by the following formulas (G-1), (G-2), and (G-3).

[Chem. 20]

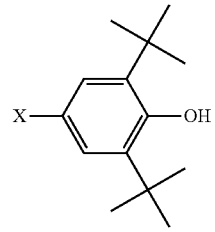

(G)

(In the formula, X represents a monovalent organic group.)

[Chem. 21]

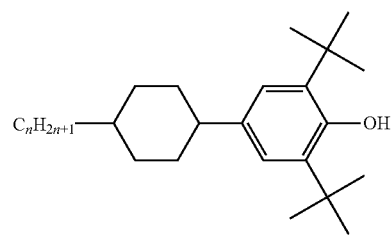

(G-1)

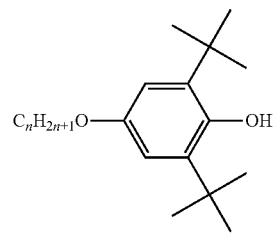

(G-2)

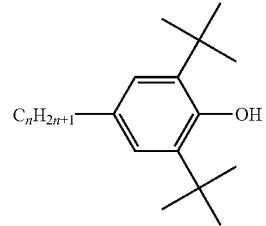

(G-3)

(In the formulas, n is an integer, preferably 3 to 20.)

Specific examples of the phenolic antioxidant represented by the above formula (G) include compounds represented by the following formulas (G-a), (G-b), (G-c), (G-d), (G-e), (G-f), and (G-g).

[Chem. 22]

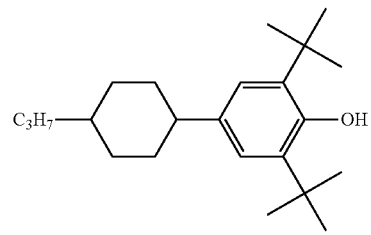

(G-a)

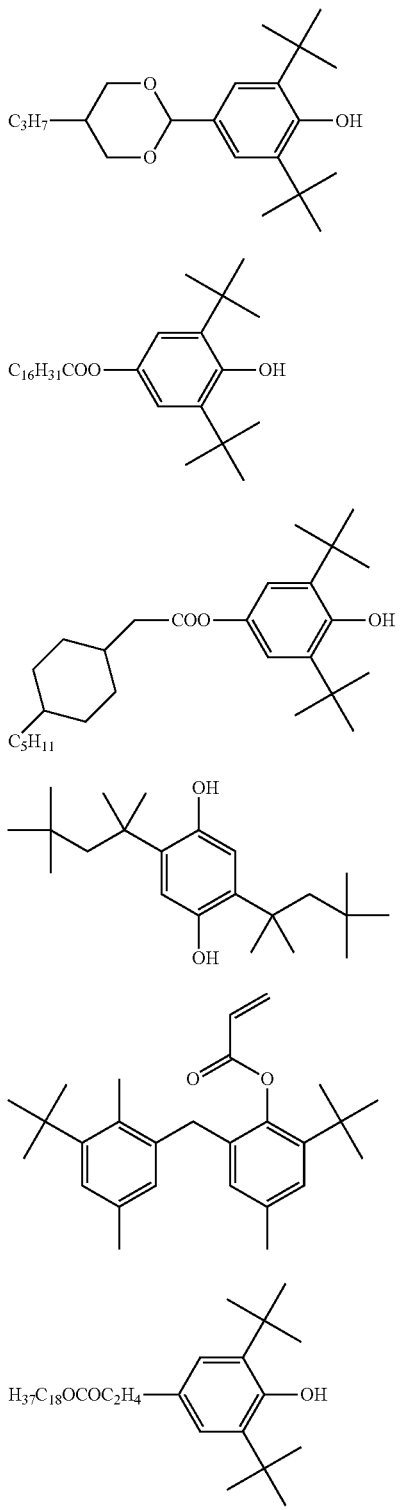

The concentration of the antioxidant is preferably 1 ppm to 10% by weight. Within this range, oxygen from the outside that has permeated the liquid crystal panel can be prevented from oxidizing the liquid crystal material, and thus burn-in and stains on a display, which might otherwise be caused by oxides, can be effectively prevented. The antioxidant, as well as the radical scavenger, can inactivate some of the radicals generated from the seal part, and thus the effect of reducing the decrease in VHR can be particularly sufficiently produced. The concentration is more preferably at least 10 ppm and more preferably up to 5% by weight, still more preferably up to 1% by weight.

In the liquid crystal panel 20 according to this embodiment, the pair of substrates 21 are bonded to each other via the seal part 24, which is disposed around the circumference of the liquid crystal layer 23, so that the liquid crystal layer 23 is retained in a predetermined region. In conventional liquid crystal display devices, the width of the seal part 24 was at least 0.8 mm in order to secure the reliability, whereas in this embodiment, the width is 0.6 mm or less at least in part because the reliability is improved by the radical scavenger and/or the antioxidant. When the width is more than 0.6 mm, an improving effect by the radical scavenger and/or the antioxidant cannot be clearly observed. The seal part preferably has a width of 0.4 mm or less at least in part, more preferably 0.2 mm or less at least in part. Smaller seal part widths lead to more significant improving effects by the radical scavenger and/or the antioxidant.

Figure 2:
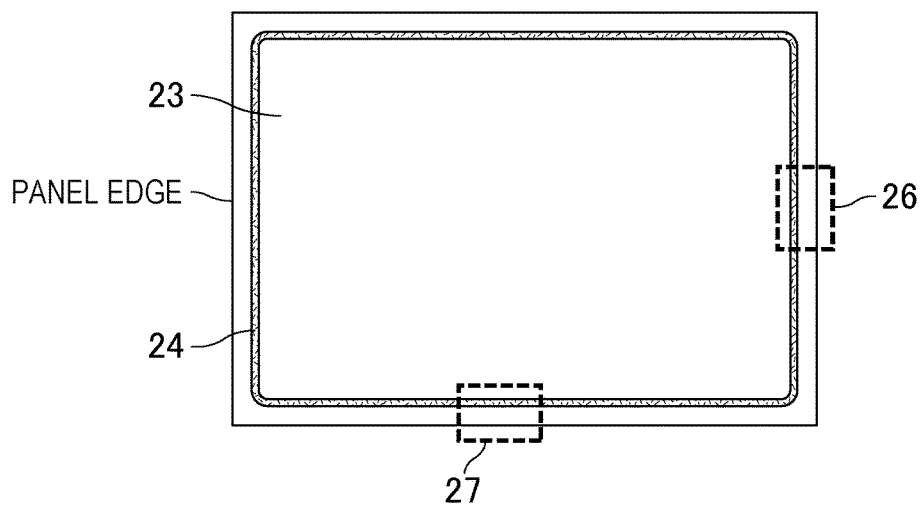
FIG. 2(a) is a schematic plan view of the liquid crystal display device according to this embodiment.
FIG. 2(b) is an enlarged plan view of a gate terminal unit.
FIG. 2(c) is an enlarged plan view of a source terminal unit.
Figure 2:
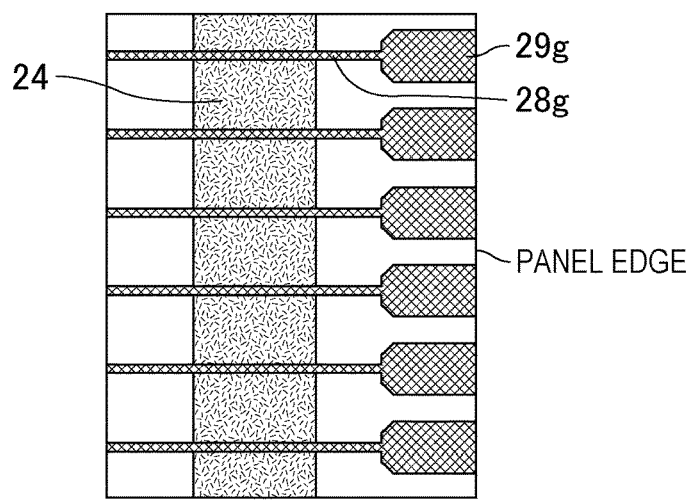
Figure 2:
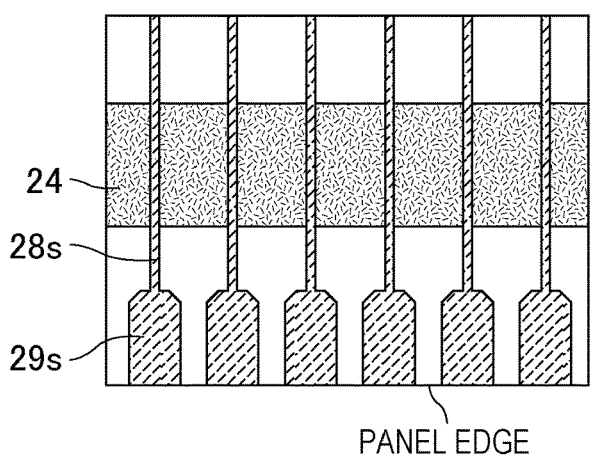

The seal part 24 is disposed at the edge (frame area) of the liquid crystal panel 20. As illustrated in FIG. 2(*b*) and FIG. 2(*c*), a gate terminal unit 26 and a source terminal unit 27 may be provided at the edge of the liquid crystal panel 20 on the TFT substrate side. The gate terminal unit 26 includes the gate signal lines 28*g* extending from a display area and gate terminals 29*g* disposed at ends of the gate signal lines 28*g*. The source terminal unit 27 includes the source signal lines 28*s* extending from the display area and source terminal 29*s* disposed at ends of the source signal lines 28*s*. To each of the gate terminals 29*g*, a connection terminal of a gate driver will be electrically connected, and to each of the source terminal 29*s*, a connection terminal of a source driver will be electrically connected.

Figure 4:
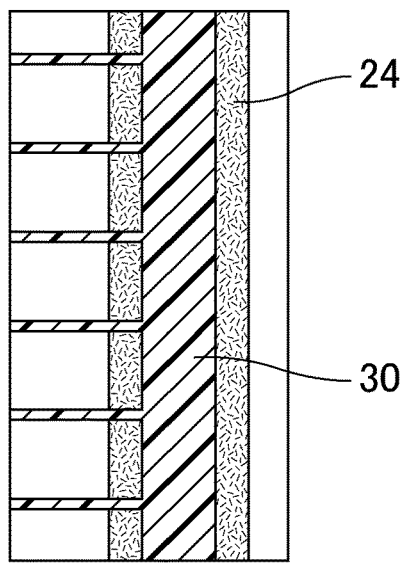
FIG. 4 is an enlarged plan view of a gate terminal unit according to another embodiment.

In place of the gate terminals 29*g*, a gate driver can be provided at the edge of the liquid crystal panel 20. FIG. 4 is an enlarged plan view of a gate terminal unit according to another embodiment. The configuration illustrated in FIG. 4 in which a monolithic gate driver 30 is disposed under the seal part 24 is advantageous for achieving the liquid crystal panel 20 having a narrower frame. Although a detailed circuit configuration of the monolithic gate driver 30 is not illustrated in FIG. 4, the monolithic gate driver 30 includes a shift register circuit for imparting a function of a gate driver.

In the embodiment shown in FIG. 2(*b*) and FIG. 2(*c*), the seal part 24 is formed over the gate signal lines 28*g* and the source signal lines 28*s* in the gate terminal unit 26 and the source terminal unit 27 so as to intersect the gate signal lines 28*g* and the source signal lines 28*s*. The gate signal lines 28*g* and the source signal lines 28*s* are typically made of light-shielding materials such as metals, and therefore part of light applied from the backside to the seal part 24 will be shielded by the gate signal lines 28*g* and the source signal lines 28*s*.

In the embodiment shown in FIG. 4, the seal part 24 is formed superposed on the monolithic gate driver 30. The monolithic gate driver 30 is formed of an oxide semiconductor (e.g., an oxide semiconductor containing indium, gallium, and zinc), low-temperature polysilicon (LTPS), or other materials. The monolithic gate driver 30 is also made of a light-shielding material, and therefore part of light applied from the backside to the seal part 24 will be shielded by the monolithic gate driver 30.

Therefore, when the seal part 24 is formed from a photocurable material, the seal part 24 may be incompletely cured. When the seal part 24 is incompletely cured, the residual photopolymerization initiator in the seal part 24 may flow out into the liquid crystal layer 23 to generate radicals in the liquid crystal layer 23.

In this embodiment, the addition of the radical scavenger and/or the antioxidant can effectively inactivate radicals in the liquid crystal layer 23. Thus, the seal part 24 can be formed from a photocurable material containing a photopolymerization initiator. The photocurable material may be any material that contains a photopolymerization initiator, and photocurable materials commonly used to seal liquid crystals can be used. Examples include compositions containing a major proportion of photopolymerizable monomers and/or oligomers for photocurable resins, such as epoxy resins and (meth)acrylic resins, and additives such as photopolymerization initiators and fillers.

The photopolymerization initiator for use may be a photoradical polymerization initiator, which generates radicals upon irradiation with light. Examples of photoradical polymerization initiators suitable for use include, but are not limited to, benzophenone compounds, acetophenone compounds, acylphosphine oxide compounds, titanocene compounds, oxime ester compounds, benzoin ether compounds, 379. IRGACURE 651, IRGACURE 819, IRGACURE 907. IRGACURE 2959. IRGACURE OXE01, IRGACURE OXE02, Lucirin TPO, DAROCUR TPO (BASF Japan); benzoin methyl ether, benzoin ethyl ether, benzoin isopropyl ether (Tokyo Chemical Industry Co., Ltd.); ESACURE TPO (DISH Japan); and MICURE TPO (MIWON). Of these, IRGACURE 651, IRGACURE 907, benzoin isopropyl ether, and Lucirin TPO, which have wide absorption wavelength ranges, are suitable. The photoradical polymerization initiators may be used alone or in a combination of two or more.

The photopolymerization initiator for use may contain a photoinitiating compound and a visible light sensitizing compound. One example of the photoinitiating compound that can be used is a compound represented by the following formula (H-2) obtained by reacting diaminobenzoic acid with diethylene glycol diglycidyl ether. One example of the visible light sensitizing compound that can be used is a compound represented by the following formula (H-3) obtained by reacting hydroxy thioxanthone with diethylene glycol diglycidyl ether.

[Chem. 24]

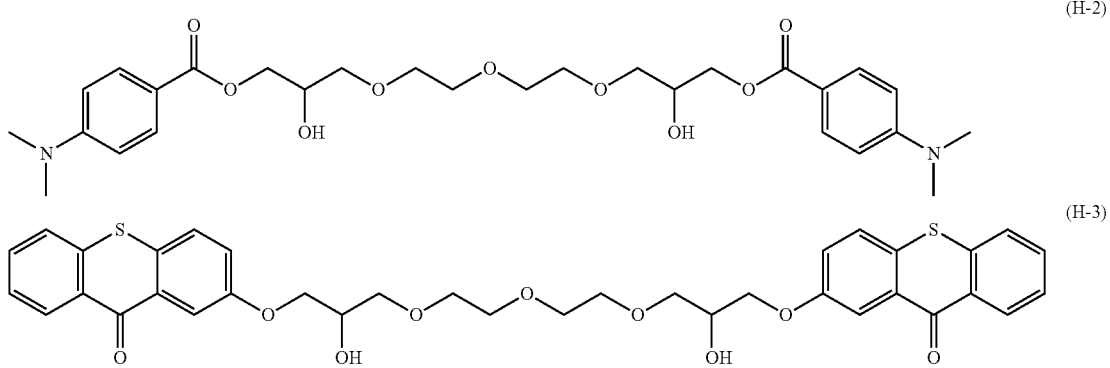

and thioxanthone. Specific examples of compounds contained in these photoradical polymerization initiators include diphenyl-2,4,6-trimethylbenzoylphosphine oxide, bis(2,4,6-trimethylbenzoye-phenylphosphine oxide, and 4-acetyl diphenyl sulfideoxime ester represented by the following formula (H-1).

[Chem. 23]

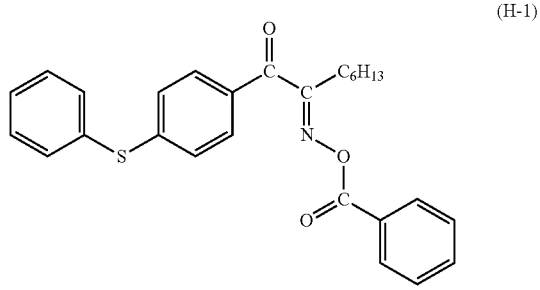

Examples of commercially available products of the above-described photoradical polymerization initiators include IRGACURE 184, IRGACURE 369, IRGACURE The photopolymerization initiator may be contained in any amount, preferably at least 0.1 parts by weight and preferably up to 10 parts by weight, based on 100 parts by weight of the major proportion. Less than 0.1 parts by weight of the photoradical polymerization initiator may fail to sufficiently cure the photocurable material. More than 10 parts by weight of the photopolymerization initiator may result in low storage stability.

The liquid crystal panel 20 is formed by a liquid crystal one-drop fill process. Therefore, the seal part is not provided with a filling opening, which would be formed in a liquid crystal injection process in order to dispose a liquid crystal composition in the liquid crystal panel 20, and has no portion where the filling opening is sealed. The liquid crystal one-drop fill process can produce a liquid crystal panel more efficiently than the liquid crystal injection process by forming the seal part 24 using a photocurable material containing a photopolymerization initiator.

The liquid crystal panel 20 may be in any alignment mode. For example, horizontal alignment modes, such as Fringe Field Switching (FFS) mode and In-Plane Switching (IPS) mode; vertical alignment modes; and Twisted Nematic (TN) mode can be used.

When the alignment mode of the liquid crystal panel is a horizontal alignment mode, radicals tend to generate from photo-alignment layers, and thus the effect of the addition of the radical scavenger and/or the antioxidant will be significant. That is to say, in a photo-alignment treatment (polarized UV irradiation) in a vertical alignment mode, it is only required to incline the pretilt angle slightly from 90°, whereas in a photo-alignment treatment in the horizontal alignment mode, it is necessary to control the direction of liquid crystal alignment (the direction in a plane of a substrate) with higher precision. Thus, in the photo-alignment treatment in the horizontal alignment mode, the amount of irradiation is typically one or more orders of magnitude larger than in the vertical alignment mode, and radicals tend to generate through side reactions in a larger amount than in the vertical alignment mode. The radical scavenger and/or the antioxidant contained in the liquid crystal layer can inactivate radicals generated during the photo-alignment treatment and thus can effectively prevent the radicals from remaining after the completion of a liquid crystal panel (after the filling of liquid crystals).

In an FFS mode, a structure (FFS electrode structure) including a planar electrode, a slit electrode, and an insulating film disposed between the planar electrode and the slit electrode is provided on at least one of the substrates 21, and an oblique electric field (fringe electric field) is formed in the liquid crystal layer 23 adjacent to the substrates 21. Typically, the slit electrode, the insulating film, and the planar electrode are disposed in this order from the side of the liquid crystal layer 23. Examples of slit electrodes that can be used include those including, as a slit, a linear aperture surrounded by an electrode and those with comb-like shapes which include a plurality of interdigitated portions and in which linear notches disposed between the interdigitated portions form slits.

In an IPS mode, a pair of interdigitated electrodes are provided on at least one of the substrates 21, and a lateral electric field is formed in the liquid crystal layer 23 adjacent to the substrates 21. One example of the pair of interdigitated electrodes that can be used is a pair of electrodes each of which includes a plurality of interdigitated portions, the plurality of interdigitated portions being disposed so as to be engaged with each other.

On each of the sides of the pair of substrates 21 opposite to the liquid crystal layer 23, a polarizer (linear polarizer) may be disposed. One typical example of the polarizer is one including a polyvinyl alcohol (PVA) film on which an anisotropic material, such as a dichromatic iodine complex, is adsorbed and aligned. Typically, protective films such as triacetylcellulose films are laminated on both surfaces of the PVA film for practical use. Between the polarizers and the pair of substrates 21, optical films such as retardation films may be disposed.

As illustrated in FIG. 1, in the liquid crystal display device according to this embodiment, the backlight 10 is disposed on the backside of the liquid crystal panel. A liquid crystal display device having such a configuration is generally called a transmissive liquid crystal display device. The backlight 10 is not particularly limited as long as it is a backlight that emits light including visible light, and may be one that emits light including visible light alone or one that emits light including both visible light and ultraviolet light. To enable a color display of the liquid crystal display device, the backlight 10 that emits white light is suitable for use. The backlight 10 suitable for use is, for example, a light-emitting diode (LED). As used herein, "visible light" means light having a wavelength of 380 nm to less than 800 nm (electromagnetic wave).

The present invention is characterized in that radicals generated from the seal part 24 and the photo-alignment layers upon exposure to light from the backlight 10 are inactivated by the radical scavenger and/or the antioxidant. Therefore, the radical scavenger and/or the antioxidant can effectively function when at least a part of the emission spectrum of the backlight 10 overlaps at least a part of the absorption spectrum of the photopolymerization initiator in the seal part or the photo-alignment layers.

The liquid crystal display device according to this embodiment may include, in addition to the liquid crystal panel 20 and the backlight 10, various members such as external circuits, such as a tape carrier package (TCP) and a printed circuit board (PCB); optical films, such as a viewing angle enhancement film and a luminance enhancement film; and a bezel (frame). These members may be incorporated into the other members. For the members other than the members that have already been described, descriptions will be omitted because any member commonly used in the field of liquid crystal display devices can be used.

The embodiments of the present invention have been described above, and all the matters described can be applied to the present invention in general.

The present invention will now be described in more detail with reference to examples and comparative examples, but these examples are not intended to limit the present invention.

Example 1

A liquid crystal panel in a fringe field switching mode (FFS mode) was actually produced by the following method.

First, a TFT substrate including a TFT, an FFS electrode structure, and others, and a color filter substrate (CF substrate) including a black matrix, a color filter, and others were provided. An alignment layer solution was applied to the surfaces of the TFT substrate and the CF substrate. The solid content of the alignment layer solution was a polymer material including, in its main chain, a polyamic acid structure.

Next, the substrates were heated at 70° C. to volatilize a solvent in the alignment layer solution. The substrates were then heated at 220° C. for post-baking. The post-baking caused imidization (a dehydration cyclization reaction) in part of the polyamic acid structure to form a polyimide structure. A rubbing process was then performed to provide a horizontal alignment layer having sufficient alignment regulation ability. The layer thickness after the post-baking was 100 nm.

Subsequently, a liquid crystal composition was dropped onto the TFT substrate, and a photocurable sealing material (UV-curable sealant available from Sekisui Chemical Co., Ltd., trade name: Photolec S-WB) containing a photopolymerization initiator was applied to the CF substrate by drawing with a dispenser. The substrate to which the sealing material is applied by drawing and the substrate onto which the liquid crystal composition is dropped can be exchanged. Alternatively, both the sealing material and the liquid crystal composition can be applied to either of the substrates. The TFT substrate and the CF substrate were then stacked on top of each other so that the liquid crystal composition was filled in between the substrates. After the stacking of the substrates, UV light was applied with a display area shielded so as to cure the sealing material. Eleven samples were produced in which the seal parts (cured sealing materials) had widths that varied in increments of 0.1 mm in the range of 0.1 mm to 1.0 mm, the widths being varied by varying the width of the application by drawing of the photocurable sealing material.

The liquid crystal composition used was a mixture of a liquid crystal material containing a compound having an alkenyl structure of the following formula (D-1-1) and a hindered amine compound (radical scavenger) of the following formula (F-1-5). The concentration of the hindered amine compound was 200 ppm based on the total amount of the liquid crystal composition. The liquid crystal material had a positive dielectric anisotropy (Δε=+9.0).

[Chem. 25]

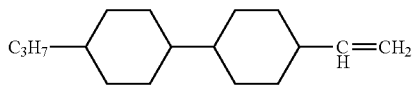

[Chem. 26]

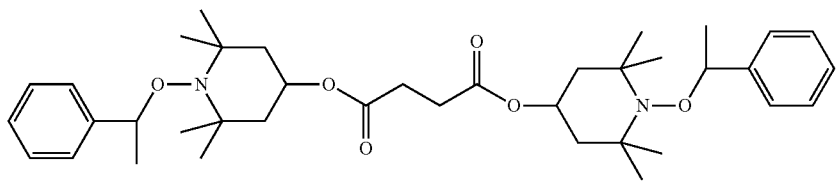

(F-1-5)

The sample was then heated at 130° C. for 40 minutes to realign liquid crystal molecules. Two polarizers were each stacked to the backside (the incident side of backlight) of the TFT substrate and the viewing side (the exiting side of backlight) of the CF substrate such that the axis of polarization was in a state of crossed Nicols. In this manner, a liquid crystal panel for an FFS mode was manufactured. Subsequently, a backlight equipped with a white LED was mounted to the backside of the liquid crystal panel to complete a liquid crystal display device of EXAMPLE 1.

Comparative Example 1

A liquid crystal display device of COMPARATIVE EXAMPLE 1 was manufactured in the same manner as in EXAMPLE 1 except that no hindered amine compound was added to the liquid crystal composition. Also in COMPARATIVE EXAMPLE 1, 11 samples were produced in which the seal parts (cured sealing materials) had widths that varied in increments of 0.1 mm in the range of 0.1 mm to 1.0 mm, the widths being varied by varying the width of the application by drawing of the photocurable sealing material.
Evaluation Test 1

The liquid crystal display devices manufactured in EXAMPLE 1 and COMPARATIVE EXAMPLE 1 were kept energized with the backlight on and observed after 500 hours. The results are shown in Table 1.

TABLE 1

| Seal Width (mm) | EXAMPLE 1 | COMPARATIVE EXAMPLE 1 | |
|---|---|---|---|
| | | Width of Unevenness at Screen Edge | Screen Burn-In |
| 0.1 | No defect | 1 mm or more | Occurred |
| 0.2 | No defect | 0.8 mm | Occurred |
| 0.3 | No defect | 0.5 mm | No defect |
| 0.4 | No defect | 0.2 mm | No defect |
| 0.5 | No defect | 0.1 mm | No defect |
| 0.6 | No defect | 0.1 mm (Thin unevenness) | No defect |
| 0.7 | No defect | No defect | No defect |
| 0.8 | No defect | No defect | No defect |
| 0.9 | No defect | No defect | No defect |
| 1.0 | No defect | No defect | No defect |

As shown in Table 1, in COMPARATIVE EXAMPLE 1, in which no hindered amine compound (radical scavenger) was added, unevenness occurred at a screen edge when the seal part width was 0.6 mm or less. The unevenness deteriorated as the seal part width decreased. In addition, screen burn-in occurred when the seal part width was 0.2 mm or less. By contrast, in EXAMPLE 1, in which a hindered amine compound was added, neither screen-edge unevenness nor screen burn-in occurred when the seal width was changed.

The liquid crystal component having an alkenyl structure used in this example is effective in reducing the viscosity of the liquid crystal material. However, the double bond in the alkenyl structure is vulnerable to attack by radicals and thus tends to cause a decrease in VHR. In EXAMPLE 1, the addition of the hindered amine compound to the liquid crystal material effectively protected the alkenyl structure against the attack by radicals. To provide a liquid crystal display device with an improved response speed, the liquid crystal component having an alkenyl structure is preferably added not only to a liquid crystal material having a positive dielectric anisotropy but also to a liquid crystal material having a negative dielectric anisotropy.

Example 2

A liquid crystal display device was manufactured in the same manner as in EXAMPLE 1 except that different types of liquid crystal material and radical scavenger were used and that an antioxidant was added.

The liquid crystal composition used was a mixture of a liquid crystal material containing a compound having an alkoxy structure of the following formula (E-3-1), a hindered amine compound (radical scavenger) of the following formula (F-1-2), and an antioxidant of the following formula (G-g). The concentration of the hindered amine compound was 200 ppm based on the total amount of the liquid crystal composition. The amount of antioxidant was 0.1% by weight based on the total amount of the liquid crystal composition. The liquid crystal material had a negative dielectric anisotropy (Δε=−3.5).

[Chem. 27]

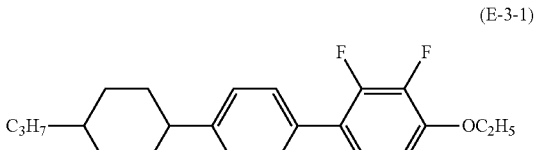

(E-3-1)

-continued

[Chem. 28]

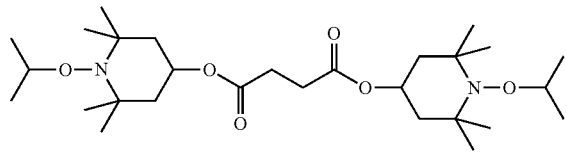

(F-1-2)

[Chem. 29]

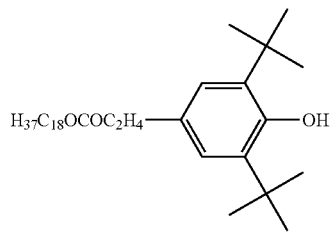

(G-g)

Comparative Example 2

A liquid crystal display device of COMPARATIVE EXAMPLE 2 was manufactured in the same manner as in EXAMPLE 2 except that no hindered amine compound and no antioxidant were added to the liquid crystal composition.

Evaluation Test 2

The liquid crystal display devices manufactured in EXAMPLE 2 and COMPARATIVE EXAMPLE 2 were kept energized with the backlight on and observed after 500 hours. The results are shown in Table 2.

TABLE 2

| | COMPARATIVE EXAMPLE 2 | | |
|---|---|---|---|
| Seal Width (mm) | EXAMPLE 2 | Width of Unevenness at Screen Edge | Screen Burn-In |
| 0.1 | No defect | 1 mm or more | Occurred |
| 0.2 | No defect | 1 mm or more | Occurred |
| 0.3 | No defect | 0.7 mm | Occurred |
| 0.4 | No defect | 0.3 mm | Occurred |
| 0.5 | No defect | 0.1 mm | No defect |
| 0.6 | No defect | 0.1 mm | No defect |
| 0.7 | No defect | No defect | No defect |
| 0.8 | No defect | No defect | No defect |
| 0.9 | No defect | No defect | No defect |
| 1.0 | No defect | No defect | No defect |

As shown in Table 2, in COMPARATIVE EXAMPLE 2, in which no hindered amine compound (radical scavenger) was added, unevenness occurred at a screen edge when the seal part width was 0.6 mm or less. The unevenness was worse as the seal part width decreased. In addition, screen burn-in occurred when the seal part width was 0.4 mm or less. By contrast, in EXAMPLE 2, in which a hindered amine compound and an antioxidant were added, neither screen-edge unevenness nor screen burn-in occurred when the seal width was changed.

In COMPARATIVE EXAMPLE 2, the degree of photo-degradation was greater than in COMPARATIVE EXAMPLE 1. This is probably because the liquid crystal material used in COMPARATIVE EXAMPLE 1 had a positive dielectric anisotropy, while the liquid crystal material used in COMPARATIVE EXAMPLE 2 had a negative dielectric anisotropy.

The alkoxy structure in the liquid crystal material used in EXAMPLE 2 and COMPARATIVE EXAMPLE 2 is advantageously used to adjust the magnitude of the dielectric anisotropy of a liquid crystal material having a negative dielectric anisotropy (a negative liquid crystal). For a liquid crystal material having a positive dielectric anisotropy (a positive liquid crystal), the magnitude of the dielectric anisotropy can readily be adjusted without using an alkoxy group. Conventional liquid crystal display devices tend to have low VHRs when liquid crystal materials including an alkoxy structure are used, and this tendency is pronounced particularly when photo-alignment layers are used in combination. However, when a radical scavenger is added as in EXAMPLE 2, the decrease in VHR can be reduced. The reason for this can be explained by the following hypothetical models 1 to 4.

Hypothetical Model 1

As shown in the following reaction formula, alkoxy structures (—OR) are vulnerable to attack by a radical $R_{AL}$ generated from a photo-alignment layer or from others and cause four patterns of radical generation reaction. The radicals generated are ionized to cause a decrease in VHR.

[Chem. 30]

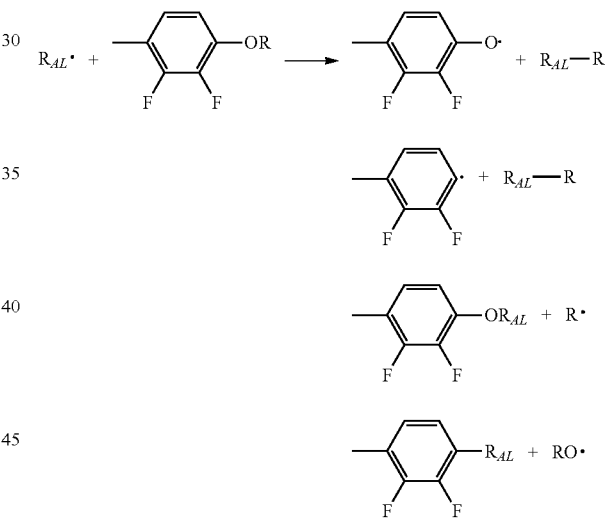

Hypothetical Model 2

As shown in the following reaction formula, a radical $R_{AL}$ generated from a photo-alignment layer or from others is bonded to oxygen in the liquid crystal layer to form a peroxide structure (ROO.). Alkoxy structures (—OR) are vulnerable to attack by the peroxide structure and cause five patterns of radical generation reaction. The radical generation reaction of each pattern is followed by another chain radical generation reaction. The radicals generated are ionized to cause a decrease in VHR. This radical chain reaction via the peroxide structure is known as an autoxidation reaction.

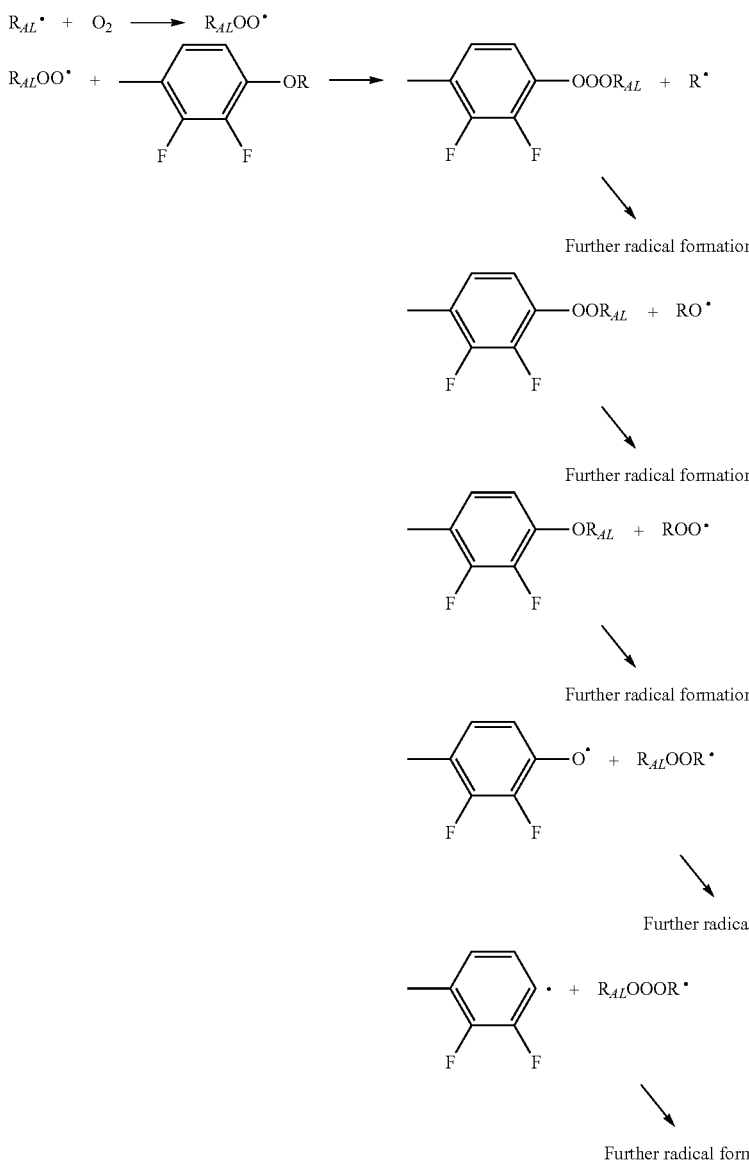

Hypothetical Model 3

Alkoxy structures (particularly, methoxy and ethoxy) are electron-donating groups and have resonance structures when exposed to light. The following formula represents moieties of a compound having an alkoxy structure, representing three resonance structures of the alkoxy structure. Of these, a resonance structure (a) in the middle and a resonance structure (B) on the right are in the ionic state and thus can cause a decrease in VHR. Furthermore, the resonance structures (a) and (b) are respectively converted into structures (a') and (b') having peroxide structures due to the presence of oxygen. The structures (a') and (b') having peroxide structures readily become radicals as shown in (a") and (b"). The radicals generated are ionized to cause a decrease in VHR.

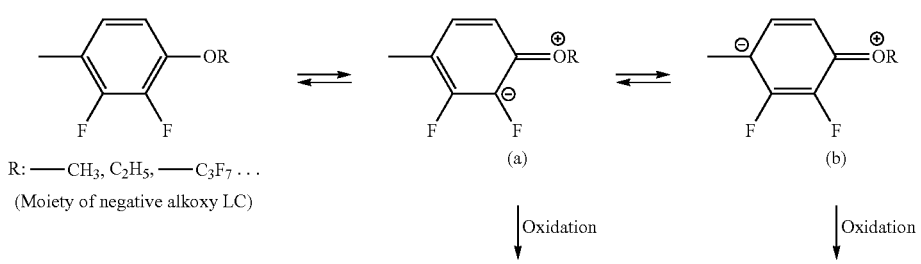

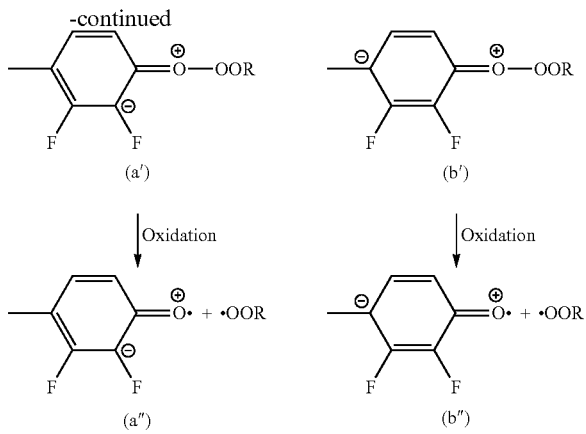

(a') (b')

Oxidation | Oxidation (a'') (b'')

Hypothetical Model 4

Negative liquid crystals including alkoxy structures have highly polarized molecular structures, and thus dissolve more impurity ions than positive liquid crystals and allow more mobile ions to be present in the liquid crystals. The mobile ions function to counter electric charges that have been charged, resulting in a decrease in VHR.

The hypothetical models 1 to 3 involve radicals, and the hypothetical models 2 and 3 involve oxidation; therefore, trapping radicals by using a radical scavenger and eliminating (reducing) oxygen from oxides by using an antioxidant can be countermeasures. The hypothetical model 4 explains that negative liquid crystals are more affected than positive liquid crystals by ionic impurities generated through radical generation and oxidation, and the trapping of radicals and the elimination of oxygen from oxides are indirect countermeasures for the hypothetical model 4. Taken together, the addition of a radical scavenger or an antioxidant to the liquid crystal layer can produce the effect of reducing the decrease in VHR that is caused when a liquid crystal material including an alkoxy structure is used.

Example 3

A liquid crystal panel in an FFS mode was actually produced by the following method.

First, a TFT substrate including a TFT, an FFS electrode structure, and others, and a CF substrate including a black matrix, a color filter, and others were provided. An alignment layer solution was applied to the surfaces of the TFT substrate and the CF substrate. The solid content of the alignment layer solution was a polymer material including, in its main chain, a polyamic acid structure and an azobenzene structure having photoreactivity.

Next, the substrates were heated at 70° C. to volatilize a solvent in the alignment layer solution. Subsequently, for a photo-alignment treatment, the surfaces of the substrates were irradiated with linearly polarized light having a dominant wavelength of 365 nm at an intensity of 2,000 mJ/cm². The direction of polarization of the linearly polarized light was set to be orthogonal to the direction in which liquid crystals were to be aligned. The irradiation with the linearly polarized light effected a trans-cis isomerization reaction of the azobenzene structure to provide alignment regulation ability. The trans isomer of the azobenzene structure has a structure represented by the following (B-5-1), and the cis isomer has a structure represented by the following (B-5-2).

[Chem. 33]

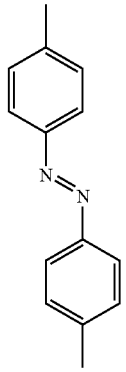

(B-5-1)

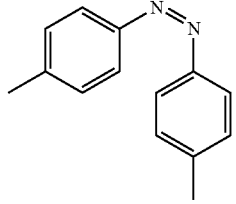

(B-5-2)

The substrates were then heated at 220° C. for post-baking. The post-baking caused imidization (dehydration cyclization reaction) in part of the polyamic acid structure to form a polyimide structure. As a result of the above procedure, a horizontal alignment layer was obtained having sufficient alignment regulation ability provided by the photoirradiation. The layer thickness after the post-baking was 100 nm.

Subsequently, a liquid crystal composition was dropped onto the TFT substrate, and a photocurable sealing material containing a photopolymerization initiator was applied to the CF substrate by drawing with a dispenser. The TFT substrate and the CF substrate were then stacked on top of each other so that the liquid crystal composition was filled in between the substrates. After the stacking of the substrates. UV light was applied with a display area shielded so as to cure the sealing material. The width of the seal part (cured sealing material) was 0.6 mm.

The liquid crystal composition used was a mixture of a liquid crystal material containing a compound having an alkenyl structure of the following formula (D-1-1) and an antioxidant of the following formula (G-g). The amount of antioxidant was 0.1% by weight based on the total amount of the liquid crystal composition. The liquid crystal material had a negative dielectric anisotropy (Δε=−3.5).

[Chem. 34]

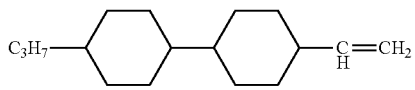

(D-1-1)

[Chem. 35]

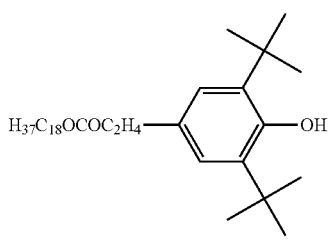

(G-g)

The sample was then heated at 130° C. for 40 minutes to realign liquid crystal molecules. Two polarizers were each stacked to the backside (the incident side of backlight) of the TFT substrate and the viewing side (the exiting side of backlight) of the CF substrate such that the axis of polarization was in a state of crossed Nicols. In this manner, a liquid crystal panel for an FFS mode was manufactured. Subsequently, a backlight equipped with a white LED was mounted to the backside of the liquid crystal panel to complete a liquid crystal display device of EXAMPLE 3.

Comparative Example 3

A liquid crystal display device of COMPARATIVE EXAMPLE 3 was manufactured in the same manner as in EXAMPLE 3 except that no antioxidant was added to the liquid crystal composition.
Evaluation Test 3
The liquid crystal display devices manufactured in EXAMPLE 3 and COMPARATIVE EXAMPLE 3 were kept energized with the backlight on. During this time, the whole screens of the liquid crystal display devices were displayed in white. After 500 hours, the whole screens were displayed in 64 shades of gray. In the liquid crystal display device of COMPARATIVE EXAMPLE 3, an extremely noticeable stain-like unevenness was observed at a screen edge. In the liquid crystal display device of EXAMPLE 3, no such defects were observed.

Since a photo-alignment layer was used in EXAMPLE 3 and COMPARATIVE EXAMPLE 3, the photo-alignment layer itself was a radical source. Thus, in COMPARATIVE EXAMPLE 3, the degree of photodegradation was great. The reason why the voltage holding ratio decreases due to the photo-alignment layer is considered as follows:

The azobenzene structure in the photo-alignment layer used in EXAMPLE 3 and COMPARATIVE EXAMPLE 3 is subjected to an alignment treatment using light at a wavelength of 365 nm, which is near the visible light region. The backlight of the liquid crystal display device mainly emits light in the visible light region to provide a color display. From the results of COMPARATIVE EXAMPLE 3, it is presumed that although at a level difficult to detect by actual spectrum analysis, the short wavelength side of an emission spectrum of the backlight and the long wavelength side of an absorption spectrum of the azobenzene structure slightly overlap each other, and thus radicals are generated. For example, the azobenzene structure is considered to undergo a photocleavage reaction upon exposure to light from the backlight, as expressed by the following reaction formula. Meanwhile, the results of EXAMPLE 3 show that the antioxidant of the above formula (G-g) can effectively inactivate the radicals generated by the reaction of the photo-alignment layer to prevent the decrease in voltage holding ratio.

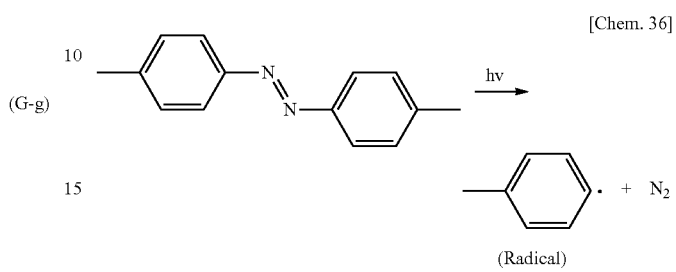

[Chem. 36]

Examples of photoreactive moieties subjected to an alignment treatment using light at a wavelength near the visible light region, similarly to the azobenzene structure, include cinnamate, chalcone, coumarin, stilbene, and phenol ester. These photoreactive moieties are all considered to absorb light at a wavelength of 340 nm or more, albeit only slightly, and thus can absorb light from the backlight to generate radicals, similarly to the azobenzene structure. For example, cinnamate, chalcone, and phenol ester undergo photo-Fries rearrangement (cleavage of an ester group) to generate radicals, and chalcone undergoes hydrogen abstraction or photocleavage to generate radicals, as expressed by the following reaction formula. Thus, also when a photo-alignment layer including any of these photoreactive moieties is used, it is preferable to add a radical scavenger or an antioxidant to the liquid crystal material.

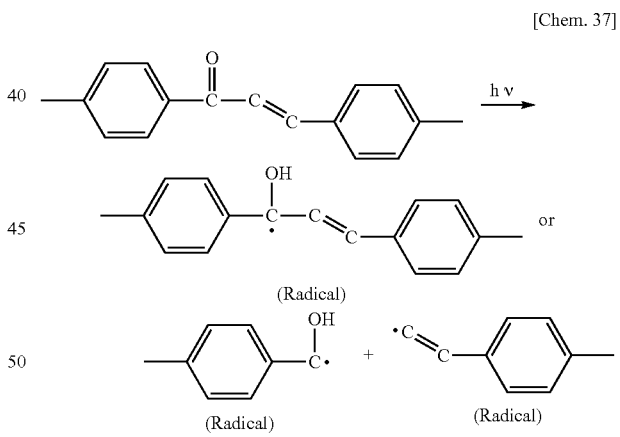

[Chem. 37]

The cyclobutane structure, which is a photoreactive moiety, typically absorbs light mainly at a wavelength of 300 nm or less to undergo a decomposition reaction where a cyclobutane site cleaves, and radicals are generated at the intermediate stage, as expressed by the following reaction formula. However, the photo-alignment layer including a cyclobutane structure may be modified to be a structure having a higher light absorbance in order to reduce the light exposure during the alignment treatment: for example, a diamine site backbone having a high light absorbance is selected, and absorbed light energy transfers to the cyclobutane site to facilitate the photocleavage of the cyclobutane site. Such a modification increases the absorbance for light at the longer wavelength side but, on the other hand, may result in that the short wavelength side of an emission spectrum of the backlight overlaps the long wavelength side of an absorption spectrum of the photo-alignment layer. In addition, the light exposure during the alignment treatment is typically as much as several hundred mJ/cm$^2$ or more, and thus some of the radicals generated during the alignment treatment may remain active after the completion of a liquid crystal panel. Thus, the decomposable photo-alignment layer having a cyclobutane structure also has a cause of burn-in.

[Chem. 38]

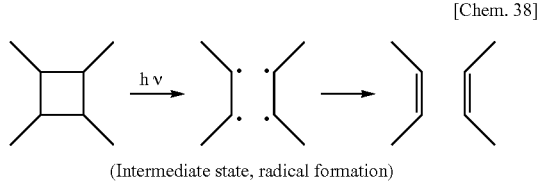

(Intermediate state, radical formation)

The liquid crystal component having an alkenyl structure used in this example, when used in combination with a photo-alignment layer that can be a radical source, tends to cause a decrease in VHR because the double bond in the alkenyl structure is vulnerable to attack by radicals. In EXAMPLE 3, the addition of an antioxidant to the liquid crystal material effectively protected the alkenyl structure against the attack by radicals.

Example 4

A liquid crystal display device including a liquid crystal panel in an FFS mode was actually produced by the following method.

First, a TFT substrate including a TFT, an FFS electrode structure, and others, and a CF substrate including a black matrix, a color filter, and others were provided. An alignment layer solution was applied to the surfaces of the TFT substrate and the CF substrate. The solid content of the alignment layer solution was a polymer material including a polysiloxane structure as a main backbone and a cinnamate group of the following formula (B-1) as a pendant photofunctional group.

[Chem. 39]

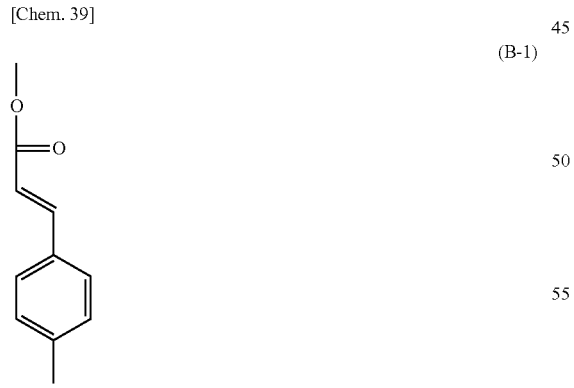

(B-1)

Next, the substrates were heated at 70° C. to volatilize a solvent in the alignment layer solution. The substrates were then heated at 230° C. for post-baking. Subsequently, for a photo-alignment treatment, the surfaces of the substrates were irradiated with linearly polarized light having a dominant wavelength of 313 nm at an intensity of 20 mJ/cm$^2$. The direction of polarization of the linearly polarized light was set to be orthogonal to the direction in which liquid crystals were to be aligned. The irradiation with the linearly polarized light effected an isomerization reaction and a dimerization reaction of the cinnamate group to provide alignment regulation ability. As a result of the above procedure, a horizontal alignment layer was obtained having alignment regulation ability provided by the photoirradiation. The layer thickness after the post-baking was 100 nm. In this example, although the light exposure during the photo-alignment treatment was small, photopolymerizable monomers added to the liquid crystal material were polymerized on the surface of the alignment layer to thereby provide improved alignment regulation ability, as described below.

Subsequently, a liquid crystal composition was dropped onto the TFT substrate, and a photocurable sealing material containing a photopolymerization initiator was applied to the CF substrate by drawing with a dispenser. The TFT substrate and the CF substrate were then stacked on top of each other so that the liquid crystal composition was filled in between the substrates. After the stacking of the substrates, UV light was applied with a display area shielded so as to cure the sealing material. The width of the seal part (cured sealing material) was 0.4 mm.

The liquid crystal composition used was a mixture of the same liquid crystal material as in EXAMPLE 3 containing the compound having an alkenyl structure of the above formula (D-1-1), a photopolymerizable monomer of the following formula (C-1-1), the same hindered amine compound (radical scavenger) as in EXAMPLE 2 represented by the above formula (F-1-2), and the same antioxidant as in EXAMPLE 3 represented by the above formula (G-g). The amount of photopolymerizable monomer was 0.25 wt % based on the total amount of the liquid crystal composition. The concentration of the hindered amine compound was 200 ppm based on the total amount of the liquid crystal composition. The amount of antioxidant was 0.1% by weight based on the total amount of the liquid crystal composition. The liquid crystal material had a negative dielectric anisotropy ($\Delta\varepsilon=-3.5$).

[Chem. 40]

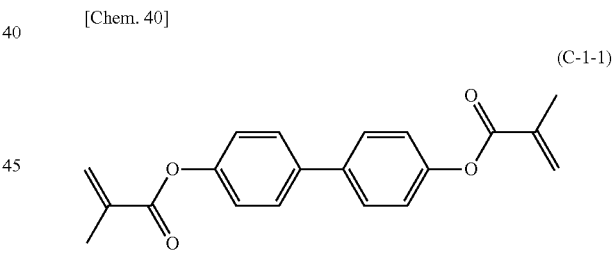

(C-1-1)

The photopolymerizable monomer for use may be other than the monomer of the above formula (C-1-1). For example, variations of the monomer of the above formula (C-1-1), such as the monomer of the above formula (C-1-2), which is terminated with acrylate groups in place of methacrylate groups, and the monomer of the above formula (C-3-1), which has a phenanthrene skeleton, may be used. Furthermore, in the above formulas (C-1-1), (C-1-2), and (C-3-1), hydrogen atoms in the skeleton may each independently be substituted with a halogen atom.

After the sealing material was cured, the display area of the liquid crystal panel was irradiated with black light at an intensity of 3,000 mJ/cm$^2$. As a result of this, the photopolymerizable monomers in the liquid crystal layer were polymerized on the surfaces of the alignment layers while capturing liquid crystal molecules. Consequently, the liquid crystal alignment on the surfaces of the alignment layers was fixed by the polymer of the photopolyrnerizable monomers to provide sufficient alignment regulation ability.

The sample was then heated at 130° C. for 40 minutes to realign liquid crystal molecules. Two polarizers were each stacked to the backside (the incident side of backlight) of the TFT substrate and the viewing side (the exiting side of backlight) of the CF substrate such that the axis of polarization was in a state of crossed Nicols, thereby manufacturing a liquid crystal panel for an FFS mode. Subsequently, a backlight equipped with a white LED was mounted to the backside of the liquid crystal panel to complete a liquid crystal display device of EXAMPLE 4.

Comparative Example 4

A liquid crystal display device of COMPARATIVE EXAMPLE 4 was manufactured in the same manner as in EXAMPLE 4 except that no hindered amine compound and no antioxidant were added to the liquid crystal composition.
Evaluation Test 4
The liquid crystal display devices manufactured in EXAMPLE 4 and COMPARATIVE EXAMPLE 4 were kept energized with the backlight on. During this time, the whole screens of the liquid crystal display devices were displayed in white. After 500 hours, the whole screens were displayed in 64 shades of gray. In the liquid crystal display device of COMPARATIVE EXAMPLE 4, a stain-like unevenness was observed at a screen edge. This unevenness is probably due to a decrease in voltage holding ratio. In the liquid crystal display device of EXAMPLE 4, no such defects were observed.

The photopolymerizable monomer used in EXAMPLE 4 and COMPARATIVE EXAMPLE 4 is a radical source and thus considered to be a factor that tends to cause radicals in the liquid crystal layer. However, adding a hindered amine compound and an antioxidant to the liquid crystal material can effectively inactivate photopolymerizable monomers that have remained after PSA treatment. For the above reason, the liquid crystal display device of COMPARATIVE EXAMPLE 4 experienced unevenness, whereas the liquid crystal display device of EXAMPLE 4 effectively avoided unevenness.
Supplementary Note One aspect of the present invention may be a liquid crystal display device including an active-matrix liquid crystal panel and a backlight, wherein the liquid crystal panel includes a liquid crystal layer, a pair of substrates between which the liquid crystal layer is sandwiched, alignment layers disposed on surfaces of the pair of substrates facing the liquid crystal layer, and a seal part that bonds the pair of substrates to each other and that is disposed around the liquid crystal layer, and the liquid crystal panel is formed by a liquid crystal one-drop fill process, wherein the liquid crystal layer includes a liquid crystal material and at least one of a radical scavenger and an antioxidant, and the seal part has a width of 0.6 mm or less at least in part. In this aspect, at least one of the radical scavenger and the antioxidant can inactivate radicals that have flowed out into the liquid crystal layer to prevent the decrease in VHR. As a result, if the seal part has a reduced width, a sufficient VHR can be maintained over a long period of time to prevent the occurrence of burn-in and stains on a display screen.

The radical scavenger preferably contains a compound represented by the following formula (1). The hindered amine compound of the following formula (1), when used as a radical scavenger, can keep on inactivating radicals through a repeating cycle and thus, if added in a small amount, can prevent the decrease in VHR, which can be caused by exposure to light from a backlight, over a long period of time. In addition, the hindered amine compound is highly reactive with radicals and thus can rapidly inactivate radicals in the liquid crystal layer.

[Chem. 41]

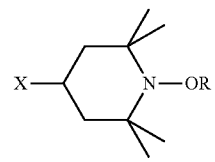

(1)

(In the formula. X represents a monovalent organic group, and R represents a hydrocarbon group.)

The antioxidant preferably contains a compound represented by the following formula (2). The compound of the following formula (2), when used as an antioxidant, can keep on inactivating radicals through a repeating cycle and thus, if added in a small amount, can prevent the decrease in VHR, which can be caused by exposure to light from a backlight, over a long period of time.

[Chem. 42]

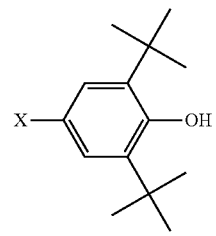

(2)

(In the formula, X represents a monovalent organic group.)

The seal part is preferably formed from a photocurable material containing a photopolymerization initiator. The photopolymerization initiator, when irradiated with light from the backlight, generates radicals to cause a decrease in VHR, but according to the present invention, the use of the radical scavenger and/or the antioxidant can sufficiently prevent such a decrease in VHR. Thus, the photocurable material containing a photopolymerization initiator, which is suitable for a liquid crystal one-drop fill process, can be used.

The seal part preferably has a width of 0.4 mm or less at least in part, more preferably 0.2 mm or less at least in part. Typically, when the width of the seal part is reduced in order to achieve a narrower frame, the liquid crystal panel may have reduced reliability, but according to the present invention, the use of the radical scavenger and/or the antioxidant can sufficiently prevent the decrease in VHR. Thus, reducing the width of the seal part can achieve a liquid crystal panel having a narrower frame.

The alignment layer may be a photo-alignment layer formed of a photo-alignable material. Examples of the photo-alignment layer include those having at least one photoreactive moiety selected from the group consisting of cinnamate, chalcone, coumarin, stilbene, azobenzene, and phenol ester. The photo-alignment layer may be a polymer obtained by polymerizing a monomer containing an acid anhydride represented by the following formula (3). In the photo-alignment layer, the long wavelength side of an absorption spectrum of the photo-alignment layer overlaps the short wavelength side of an emission spectrum of the backlight, and thus radicals are generated upon irradiation with light from the backlight. Thus, the effect of preventing the decrease in VHR can be sufficiently obtained when the radical scavenger and/or the antioxidant is used.

[Chem. 43]

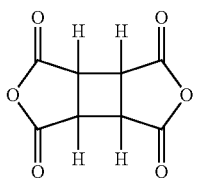

(3)

(In the formula, hydrogen may be substituted.)

At least one component of the liquid crystal material may be a compound having an alkenyl structure, and examples of the compound having an alkenyl structure include compounds represented by the following formulas (4-1), (4-2), and (4-3). The liquid crystal component having an alkenyl structure is effective in reducing the viscosity of the liquid crystal material, but the double bond in the alkenyl structure is vulnerable to attack by radicals. Thus, the effect of preventing the decrease in VHR can be sufficiently obtained when the radical scavenger and/or the antioxidant is used.

[Chem. 44]

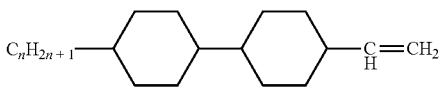

(4-1)

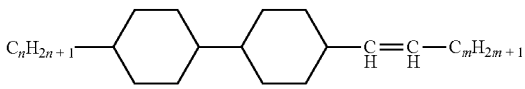

(4-2)

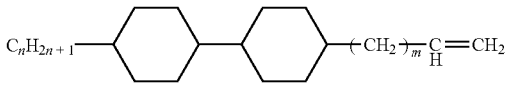

(4-3)

(In the formula, m and n are the same or different integers.)

The liquid crystal material may have a negative dielectric anisotropy. Conventionally, defects such as burn-in and stains tended to be more apparent when a liquid crystal material having a negative dielectric anisotropy was used than when a liquid crystal material having a positive dielectric anisotropy was used. Thus, the effect of preventing the decrease in VHR can be more sufficiently obtained when the radical scavenger and/or the antioxidant is used.

At least one component of the liquid crystal material may be a compound including an alkoxy structure, and examples of the compound including an alkoxy structure include compounds represented by the following formulas (5-1), (5-2), (5-3), (5-4), and (5-5). Alkoxy structures (particularly, methoxy and ethoxy) have resonance structures including a structure in the ionic state and thus can cause a decrease in VHR. Thus, it is required to prevent a further decrease in VHR by using the radical scavenger and/or the antioxidant.

[Chem. 45]

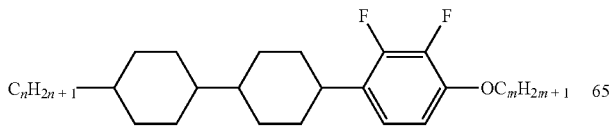

(5-1)

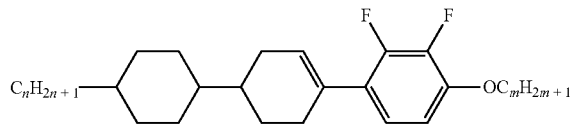

(5-2)

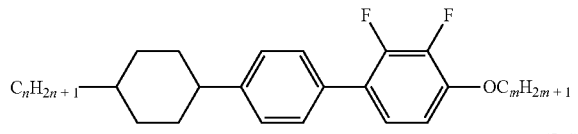

(5-3)

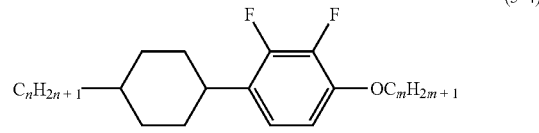

(5-4)

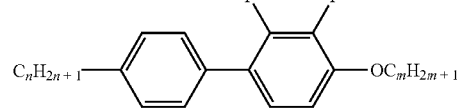

(5-5)

(In the formulas, m and n are the same or different integers.)

The alignment mode of the liquid crystal panel is preferably Fringe Field Switching mode or In-Plane Switching mode. In a photo-alignment treatment in a horizontal alignment mode, it is necessary to control the direction of liquid crystal alignment with high precision. Thus, in the photo-alignment treatment in the horizontal alignment mode, the amount of irradiation is typically one or more orders of magnitude larger than in the vertical alignment mode, and radicals tend to generate through side reactions in a larger amount than in the vertical alignment mode. Thus, the effect of preventing the decrease in VHR can be sufficiently obtained when the radical scavenger and/or the antioxidant is used.

The liquid crystal panel may further include, on surfaces of the alignment layers facing the liquid crystal layer, a layer containing a polymer obtained by polymerizing a photopolymerizable monomer represented by the following formula (6), and examples of Y in the following formula (6) include structures represented by the following formulas (7-1), (7-2), and (7-3). When the photopolymerizable monomer is added to the liquid crystal layer for PSA treatment, the photopolymerizable monomer, in addition to the photo-alignment layers, serves as a radical source, and thus radicals are more likely to generate in the liquid crystal layer. Thus, the effect of preventing the decrease in VHR can be sufficiently obtained when the radical scavenger and/or the antioxidant is used.

A1-Y-A2 (6)

(In the formula, Y represents a structure including at least one benzene ring and/or fused benzene ring. Hydrogen in the benzene ring and the fused benzene ring may be substituted with halogen. At least one of A1 and A2 represents acrylate or methacrylate. A1 and A2 are directly bonded to the benzene ring or the fused benzene ring.)

[Chem. 46]

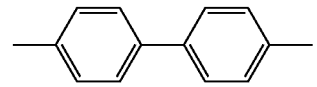

(7-1)

-continued

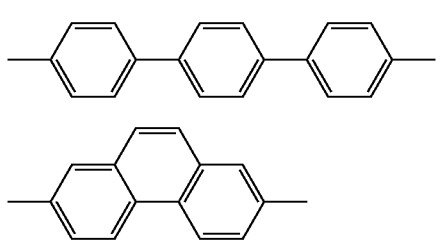

(7-2)

(7-3)

(In the formula, hydrogen may be substituted with halogen.)

The aspects of the present invention described above may be combined as appropriate without departing from the spirit of the present invention.

REFERENCE SIGNS LIST

10 Backlight
20 Liquid crystal panel
21 Substrate
22 Alignment layer
23 Liquid crystal layer
24 Seal part
26 Gate terminal unit
27 Source terminal unit
28g Gate signal line
28s Source signal line
29g Gate terminal
29s Source terminal
30 Monolithic gate driver

The invention claimed is:

1. A liquid crystal display device comprising an active-matrix liquid crystal panel and a backlight,
wherein the liquid crystal panel comprises a liquid crystal layer, a pair of substrates between which the liquid crystal layer is sandwiched, alignment layers disposed on surfaces of the pair of substrates facing the liquid crystal layer, and a seal part that bonds the pair of substrates to each other and that is disposed around the liquid crystal layer, and
the liquid crystal panel is formed by a liquid crystal one-drop fill process,
wherein the liquid crystal layer comprises a liquid crystal material and at least one of a radical scavenger and an antioxidant,
wherein the radical scavenger comprises a compound represented by formula (1):

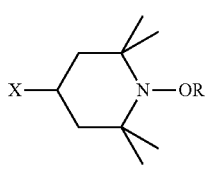

(1)

wherein X represents a monovalent organic group, and R represents a hydrocarbon group, and
the antioxidant comprises a compound represented by formula (2):

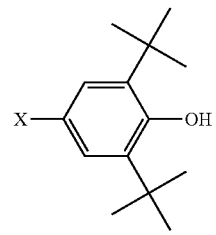

(2)

wherein X represents a monovalent organic group, and
wherein the alignment layers are photo-alignment layers formed of a photo-alignable material, and
the photo-alignment layer is a polymer obtained by polymerizing a monomer comprising an acid anhydride represented by formula (3):

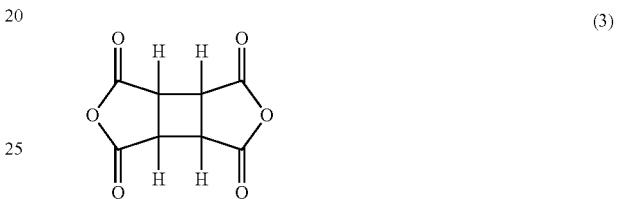

(3)

wherein hydrogen may be substituted, and
the seal part has a width of 0.6 mm or less at least in part.

2. The liquid crystal display device according to claim 1, wherein the seal part is formed from a photocurable material comprising a photopolymerization initiator.

3. The liquid crystal display device according to claim 1, wherein the seal part has a width of 0.4 mm or less at least in part.

4. The liquid crystal display device according to claim 3, wherein the seal part has a width of 0.2 mm or less at least in part.

5. The liquid crystal display device according to claim 1, wherein at least one component of the liquid crystal material is a compound having an alkenyl structure.

6. The liquid crystal display device according to claim 5, wherein the compound having an alkenyl structure is a compound represented by formula (4-1), (4-2), or (4-3):

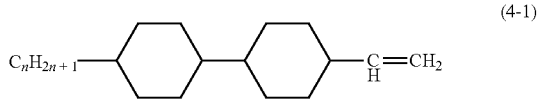

(4-1)

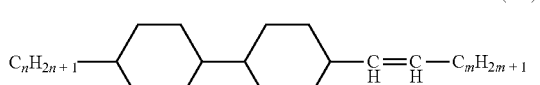

(4-2)

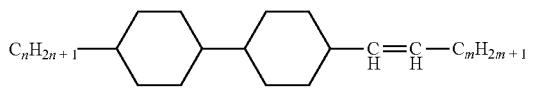

(4-3)

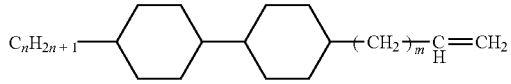

wherein m and n are the same or different integers.

7. The liquid crystal display device according to claim 1, wherein at least one component of the liquid crystal material is a compound comprising an alkoxy structure.

8. The liquid crystal display device according to claim 7, wherein the compound comprising an alkoxy structure is a compound represented by formula (5-1), (5-2), (5-3), (5-4), or (5-5):

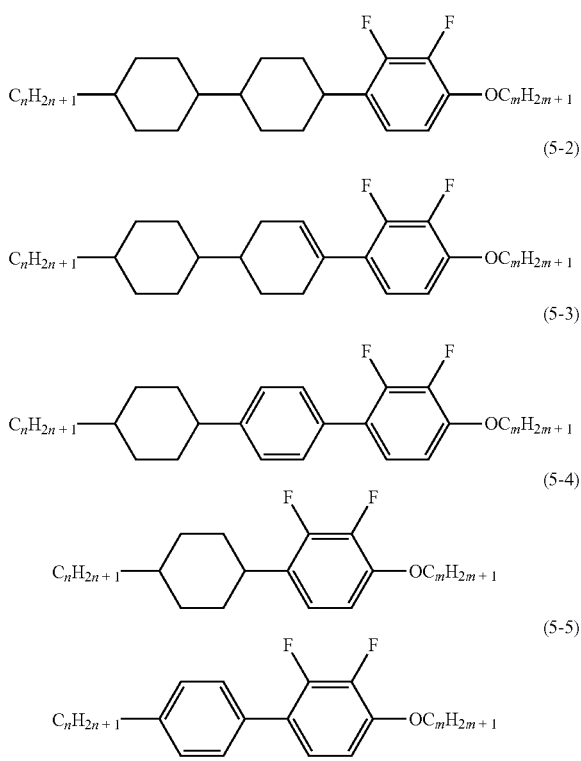

wherein m and n are the same or different integers.

9. The liquid crystal display device according to claim 1, wherein the liquid crystal panel further comprises, on surfaces of the alignment layers facing the liquid crystal layer, a layer comprising a polymer obtained by polymerizing a photophlymerizable monomer represented by formula (6):

$$A1\text{-}Y\text{-}A2 \tag{6}$$

wherein Y represents a structure comprising at least one benzene ring and/or fused benzene ring, and hydrogen in the benzene ring and the fused benzene ring may be substituted with halogen; and at least one of A1 and A2 represents acrylate or methacrylate, A1 and A2 being directly bonded to the benzene ring or the fused benzene ring.

10. The liquid crystal display device according to claim 9, wherein Y in formula (6) is a structure represented by formula (7-1), (7-2), or (7-3):

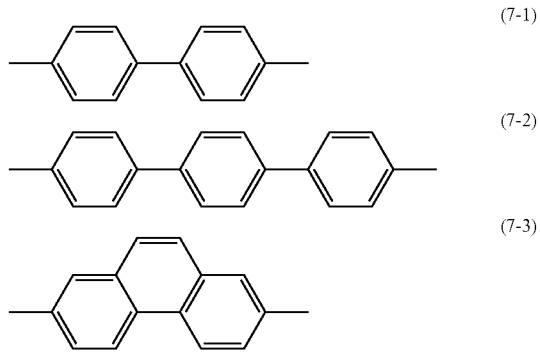

wherein hydrogen may be substituted with halogen.

* * * * *